United States Patent
Isaac et al.

(10) Patent No.: US 9,927,854 B2
(45) Date of Patent: Mar. 27, 2018

(54) POWER SEQUENCING CIRCUITRY AND METHODS FOR SYSTEMS USING CONTACTLESS COMMUNICATION UNITS

(71) Applicant: Keyssa Systems, Inc., Campbell, CA (US)

(72) Inventors: Roger D. Isaac, San Jose, CA (US); Hoo Kim, Sunnyvale, CA (US); Alan T. Ruberg, Menlo Park, CA (US); Sunderraj V. Palaniraj, Saratoga, CA (US)

(73) Assignee: KEYSSA SYSTEMS, INC., Campbell, CA (US)

( * ) Notice: Subject to any disclaimer, the term of this patent is extended or adjusted under 35 U.S.C. 154(b) by 192 days.

(21) Appl. No.: 15/063,845

(22) Filed: Mar. 8, 2016

(65) Prior Publication Data

US 2017/0262034 A1    Sep. 14, 2017

(51) Int. Cl.
*G06F 13/00* (2006.01)
*G06F 1/26* (2006.01)
*G06F 9/44* (2018.01)
*G06F 13/40* (2006.01)
*G06F 13/42* (2006.01)

(52) U.S. Cl.
CPC ............ *G06F 1/266* (2013.01); *G06F 9/4401* (2013.01); *G06F 13/4068* (2013.01); *G06F 13/4081* (2013.01); *G06F 13/4282* (2013.01); *G06F 13/4278* (2013.01); *G06F 13/4295* (2013.01)

(58) Field of Classification Search
CPC ...................................................... G06F 1/263
See application file for complete search history.

(56) References Cited

U.S. PATENT DOCUMENTS

| 2013/0039230 | A1* | 2/2013 | Lee .................. H04W 52/0219 370/280 |
| 2014/0273856 | A1 | 9/2014 | Kyles et al. |
| 2016/0043776 | A1 | 2/2016 | McCormack et al. |

* cited by examiner

*Primary Examiner* — Henry Tsai
*Assistant Examiner* — Juanito Borromeo
(74) *Attorney, Agent, or Firm* — Van Court & Aldridge LLP

(57) ABSTRACT

Embodiments discussed herein refer to systems, methods, and circuits for conforming to power up sequencing rules of a conventional hard-wired data connection even though the hard-wired data connection that would ordinarily exist between two data controllers has been replaced with one or more contactless connectors. A consequence of replacing the hard-wired connection with a contactless connector is that the data controllers no longer directly control the power sequencing between the controllers because they are not able to directly communicate with each other over the hard-wired data connections. Power sequence assist circuitry may be used to assists the data controllers in establishing a link in accordance with the power sequencing rules of a particular wired interface despite the intentionally broken hard-wired data connection between the two controllers by instructing the contactless connectors to communicate with their respective data controllers in compliance with the power sequencing rules.

21 Claims, 19 Drawing Sheets

| SOURCE | NOT CONNECTED | | CONNECTED | |
|---|---|---|---|---|
| | AUX+ LOW | AUX- HIGH | AUX+ LOW | AUX- HIGH |
| SINK | HIGH | LOW | LOW | HIGH |

POWER SEQUENCING CIRCUITRY AND METHODS FOR SYSTEMS USING CONTACTLESS COMMUNICATION UNITS

FIELD OF THE INVENTION

The present disclosure relates to power sequencing, and more particularly to power sequencing circuitry and methods for systems using contactless communications system.

BACKGROUND

Electronic devices can be "connected" together to enable data transfer between the devices. Typically, the connection between the two devices can be a mechanical connection or a wireless connection. Mechanical connections such as USB are typically point-to-point, and require mechanical connectors at each device, and sometimes a cable between the devices. When the devices are connected together, the mechanical connection initiates a sequence whereby both devices communicate with each other to determine how data should be communicated. The parameters by which they should communicate with each other are defined by a specification. If the devices do not adhere to rules established by the specification, the devices may not be able to communicate with each other as intended. When mechanical connections are used for establishing power and data transfers between devices, the devices are operating in a system architecture for which the specification was designed. However, when contactless communication units, are used to contactlessly convey data in lieu of physical hard-wired data connection, the system architecture for which the specification was designed no longer exist. Accordingly, what is needed are circuitry and methods for conforming to the rules of the specification despite having intentionally inserted contactless connections in between the hard-wired data connection.

BRIEF SUMMARY

Embodiments discussed herein refer to systems, methods, and circuits for conforming to power up sequencing rules of a conventional hard-wired data connection even though the hard-wired data connection that would ordinarily exist between two data controllers has been replaced with one or more contactless connectors. A consequence of replacing the hard-wired connection with a contactless connector is that the data controllers no longer directly control the power sequencing between the controllers because they are not able to directly communicate with each other over the hard-wired data connections. Power sequence assist (PSA) circuitry may be used to assist the data controllers in establishing a link in accordance with the power sequencing rules of a particular wired interface despite the intentionally broken hard-wired data connection between the two controllers by instructing the contactless connectors to communicate with their respective data controllers in compliance with the power sequencing riles.

A directed contactless communications system is provided that includes a host device having a first interface, a host controller coupled to the first interface, and first power sequence assistance (PSA) circuitry coupled to the first interface and the host controller. The first PSA circuitry includes host delay circuitry coupled to the first interface, and a first contactless communications transmitter unit (CCTU) coupled to the host delay circuitry and the host controller. The system includes a non-host device operative to communicate with the host device according to a wired interface protocol. The non-host device includes a second interface for coupling to the first interface, a device controller coupled to the second interface, and second PSA circuitry coupled to the second interface and the device controller. The second PSA circuitry includes device delay circuitry coupled to the second interface, second CCTU coupled to the device delay circuitry and the device controller, and first contactless communication receiver unit (CCRU) coupled to the device controller, wherein in response to a coupling between the first and second interfaces, the host delay circuitry and device delay circuitry synchronize activation of at least one pin in respective first and second CCTUs to comply with timing sequence requirements of the wired interface protocol.

According to embodiments discussed herein, the device controller can be characterized as having a power up sequence time period, and wherein the host delay circuitry includes a delay timer that delays activation of the at least one pin in the first CCTU by the power up sequence time period, and wherein the device delay circuitry comprises a delay timer that delays activation of the at least one pin in the second CCTU by the power up sequence time period.

According to embodiments discussed herein, the first CCTU comprises a pin that enables a termination resistance of a host data path coupled to the host controller, and wherein the second CCTU comprises a pin that enables a termination resistance of a device data path coupled to the device controller.

According to embodiments discussed herein, the first CCTU comprises a pin that enables the first CCTU to begin contactless communications, and wherein the second CCTU comprises a pin that enables the second CCTU to begin contactless communications.

According to embodiments discussed herein, the first CCRU comprises a pin that is coupled to a Vbus_enable pin of the device controller, wherein in response to the coupling between the first and second mechanical interfaces, the first CCRU asserts the Vbus_enable pin to comply with timing sequence requirements of the wired interface protocol.

According to embodiments discussed herein, the first PSA circuitry further comprises a second CCRU, wherein the first CCTU is operative to contactlessly communicate with the first CCRU, and wherein the second CCTU is operative to contactlessly communicate with the second CCRU.

A method is provided for controlling a power sequence of a directed contactless communication system comprising a host device and a non-host device that communicate with each other according to a wired interface protocol. The method includes responsive to a coupling event in which power is supplied from the host device to the non-host device: powering up a device controller, wherein the device controller is characterized by a power up sequence time period, initiating a host device delay timer having a first delay time period that is substantially the same as the power up sequence time period, and initiating a non-host device delay timer having a second delay time period that is substantially the same as the power up sequence time period. The method includes enabling a termination and contactless transmission of a first contactless communication transmission unit (CCTU) coupled to a host controller of the host device at an end of the first delay time period, and enabling a termination and contactless transmission of a second CCTU coupled to the device controller of the non-host device at an end of the second delay time period, wherein the enabling of the terminations and the contactless transmissions of the first and second CCTUs are timely performed to comply with timing sequence requirements of the wired interface protocol.

According to embodiments discussed herein, a first contactless communication receiver unit (CCRU) that is coupled to the device controller is instructed to enable a Vbus_enable pin of the device controller in response to contactless transmission from the first CCTU.

According to embodiments discussed herein, enablement of the Vbus_enable pin confirms to the device controller that the non-host device is coupled to the host device.

According to embodiments discussed herein, a second CCRU is coupled to the host controller, wherein the first CCTU contactlessly communicates with the first CCRU, and wherein the second CCTU contactlessly communicates with the second CCRU.

According to embodiments discussed herein, wherein a host controller begins negotiating a link in response to the enabled termination; and wherein the device controller begins negotiating with the host controller in response to the enabled Vbus and enabled termination of the second CCTU.

An automatic contactless communications non-host device is provided that uses a coupling to receive power from a host device and that communicates with the host device according to a wired interface protocol. The non-host device includes a first interface, a device controller coupled to the first interface, first power sequence assistance (PSA) circuitry coupled to the first interface and the device controller. The first PSA circuitry includes device delay circuitry coupled to the first mechanical interface, a first contactless communications transmitter unit (CCTU) coupled to the device delay circuitry and the device controller, a first contactless communications receiver unit (CCRU) coupled to the device controller, wherein the first CCTU and first CCRU operate according to respective state machines that timely control activation of a termination associated with the first CCTU and assertion of a Vbus_enable of the device controller in order to comply with timing sequence requirements of the wired interface protocol.

According to embodiments discussed herein, the state machines are progression of consciousness state machines.

According to embodiments discussed herein, the first CCTU contactlessly communicates with a second CCRU associated with the host device, and wherein the first CCRU contactlessly communicates with a second CCTU associated with the host device, wherein the first and second CCTUs and CCRUs collaborate to timely control activation of the termination associated with the first CCTU, activation of a termination associated with the host device, and assertion of the Vbus_enable of the device controller in order to comply with timing sequence requirements of the wired interface protocol.

According to embodiments discussed herein, the device controller is characterized as having a power up sequence time period, and wherein the device delay circuitry comprises a delay timer having a delay period that equals or exceeds the power up sequence time period, wherein the first CCTU activates its termination and begins contactlessly transmitting when the delay period lapses.

According to embodiments discussed herein, the Vbus_enable of the device controller is enabled when the first CCRU receives a contactless communication from a CCTU associated with the host device.

A method is provided for controlling a power sequence of an automatic contactless communication non-host device that communicates with a host device according to a wired interface protocol. The method includes receiving power from the host device in response to a coupling between the host device and the non-host device, wherein a trigger point earmarks an initial receipt of the power; at the trigger point, powering up a device controller, wherein the device controller is characterized by a power up sequence time period; at the trigger point, initiating a device delay timer having a delay time period that is substantially the same as the power up sequence time period; enabling a termination and contactless communication of a first contactless communication transmission unit (CCTU) coupled to the device controller at an end of the delay time period; asserting a Vbus_enable of the device controller when a first contactless communication receiver unit (CCRU) in response to receiving a contactless signal from the a CCTU associated with the host device, wherein the enabling of the termination and the asserting of the Vbus_enable are timely performed to comply with timing sequence requirements of the wired interface protocol.

According to embodiments discussed herein, the first CCTU and first CCRU operate according to respective state machines that timely control the enabling of the contactless communication and the asserting of the Vbus_enable.

According to embodiments discussed herein, the state machines are progression of consciousness state machines, and wherein the Vbus_enable is asserted in response to completion of the progression of consciousness state machines.

According to embodiments discussed herein, the first CCTU contactlessly communicates with a second CCRU associated with the host device, and wherein the first CCRU contactlessly communicates with a second CCTU associated with the host device, wherein the first and second CCTUs and CCRUs collaborate to timely control activation of the termination associated with the first CCTU, activation of a termination associated with the host device, and assertion of the Vbus_enable of the device controller in order to comply with timing sequence requirements of the wired interface protocol.

According to embodiments discussed herein, data is contactlessly communicating between the host device and the non-host device according to the wired interface protocol after the termination has been enabled and the Vbus_enable has been asserted.

An independently powered automatic contactless communications non-host device that communicates with a host device according to a wired interface protocol is provided. The non-host device includes a power source; a device controller coupled to the power source; a first contactless communications transmitter unit (CCTU) coupled to the device controller, and a first contactless communications receiver unit (CCRU) coupled to the device controller, wherein in response to a detected presence of the host device, the first CCTU and first CCRU operate according to respective state machines that timely control activation of a termination associated with the first CCTU and assertion of a Vbus_enable of the device controller in order to comply with timing sequence requirements of the wired interface protocol.

According to embodiments discussed herein, power up complete detection circuitry is provided that determines when the device controller has completed its power up sequence, wherein the power up complete detection circuitry is coupled to the first CCTU, wherein the power up complete detection circuitry instructs the CCTU to initiate beaconing to locate the host device upon determining that that device controller has completed its power up sequence.

According to embodiments discussed herein, the first CCTU contactlessly communicates with a second CCRU associated with the host device, and wherein the first CCRU contactlessly communicates with a second CCTU associated with the host device, wherein the first and second CCTUs and CCRUs collaborate to timely control activation of the termination associated with the first CCTU, activation of a termination associated with the host device, and assertion of the Vbus_enable of the device controller in order to comply with timing sequence requirements of the wired interface protocol.

A method for controlling a power sequence of an automatic contactless communication non-host device that communicates with a host device according to a wired interface protocol, the non-host device comprising a device controller. The method includes detecting presence of a contactless communication unit associated with the host device, in response to the detected presence, enabling a termination of a first contactless communication transmission unit (CCTU) coupled to the device controller; and asserting a Vbus_enable of the device controller by causing a first contactless communication receiver unit (CCRU) to assert a path coupled to the Vbus_enable, wherein the enabling of the termination and the asserting of the Vbus_enable are timely performed to comply with timing sequence requirements of the wired interface protocol.

According to embodiments discussed herein, the first CCTU and first CCRU operate according to respective state machines that timely control the enabling of the termination and the asserting of the Vbus_enable.

According to embodiments discussed herein, the first CCTU contactlessly communicates with a second CCRU associated with the host device, and wherein the first CCRU contactlessly communicates with a second CCTU associated with the host device, wherein the first and second CCTUs and CCRUs collaborate to timely control activation of the termination associated with the first CCTU, activation of a termination associated with the host device, and assertion of the Vbus_enable of the device controller in order to comply with timing sequence requirements of the wired interface protocol.

According to embodiments discussed herein, data is contactlessly communicated between the host device and the non-host device according to the wired interface protocol after the termination has been enabled and the Vbus_enable has been asserted.

According to embodiments discussed herein, there is provided a determination when a power up sequence of the device controller has completed, and initiating a beaconing sequence after it has been determined that the power up sequence of the device controller has completed.

A host device configured to establish a communications link according to a wired interface protocol with a non-host device is provided. The host device includes a first interface constructed to be coupled with a second interface associated with the non-host device; a host controller coupled to the first interface; and first power sequence assistance (PSA) circuitry coupled to the first interface and the host controller, the first PSA circuitry comprising: host delay circuitry coupled to the first interface; and a first contactless communications transmitter unit (CCTU) coupled to the host delay circuitry and the host controller, wherein in response to a coupling between the first and second interfaces, the host delay circuitry synchronizes activation of at least one pin of the first CCTU with activation of at least one pin of a second CCTU to comply with timing sequence requirements of the wired interface protocol.

According to embodiments discussed herein, the at least one pin of the first CCTU is a termination pin coupled to the host controller, and wherein the at least one pin of the second CCTU is a termination pin coupled to a device controller associated with the non-host device.

According to embodiments discussed herein, there is provided the second interface for coupling to the first interface; the device controller coupled to the second interface; and second PSA circuitry coupled to the second interface and the device controller, the second PSA circuitry comprising: device delay circuitry coupled to the second interface; second CCTU coupled to the device delay circuitry and the device controller; and first contactless communication receiver unit (CCRU) coupled to the device controller.

According to embodiments discussed herein, the device controller is characterized as having a power up sequence time period, and wherein the host delay circuitry comprises a delay timer that delays activation of the at least one pin in the first CCTU by the power up sequence time period, and wherein the device delay circuitry comprises a delay timer that delays activation of the at least one pin in the second CCTU by the power up sequence time period.

According to embodiments discussed herein, the first CCRU comprises a pin that is coupled to a Vbus_enable pin of the device controller, wherein in response to the coupling between the first and second mechanical interfaces, the first CCRU asserts the Vbus_enable pin to comply with timing sequence requirements of the wired interface protocol.

A sink device configured to establish a communications link according to a wired interface protocol with a source device is provided. The sink device includes a controller comprising a source detect (p) and a source detect (n); an auxiliary contactless communications unit (CCU) coupled to the controller via a plurality of connections including hot plug detect, auxiliary+ (AUX+), and auxiliary− (AUX−); at least a first contactless communications receiver unit (CCRU) coupled to the controller via a first connection and to the auxiliary CCU via a second connection, wherein the first connection is coupled to the source detect (n); an inverter coupled to the first connection and to the source detect (p); wherein when the first connection is LOW, the source detect (p) is HIGH and source detect (n) is LOW; wherein when the first connection is HIGH, source detect (p) is LOW and source detect (p) is HIGH; and wherein the first connection switches from LOW to HIGH in response to the first CCRU receiving a contactless signal from the source device.

According to embodiments discussed herein, the plurality of connections comprises a link enable connection, wherein the controller asserts the link enable connection to initiate a beaconing sequence in the auxiliary CCU.

According to embodiments discussed herein, the controller is operative to assert the hot plug detect connection, wherein the asserted hot plug detect connection is contactlessly transmitted from the auxiliary AUX CCU to the source device.

According to embodiments discussed herein, the controller begins negotiating a DisplayPort link with a counterpart controller associated with the source device after the first connection switches from LOW to HIGH.

According to embodiments discussed herein, the controller begins negotiating a Mobility DisplayPort link with a counterpart controller associated with the source device.

According to embodiments discussed herein, the AUX+ connection is not connected to a pullup voltage source via a resistor, and wherein the AUX− connection is not connected to a ground source via a resistor.

A source device configured to establish a communications link according to a wired interface protocol with a sink device is provided. The source device includes a controller; an auxiliary contactless communications unit (CCU) coupled to the controller via a plurality of connections including auxiliary+(AUX+) connection; at least a first contactless communications receiver unit (CCTU) coupled to the auxiliary CCU via a first connection; and pulldown circuitry coupled to the first connection and to the AUX+ connection, wherein when the pulldown circuitry is activated, the AUX+ connection is pulled down to ground via at least a resistor, wherein the pulled down AUX+ connection informs the controller the sink device is attempting to establish a Mobility Display Port communications link; and wherein when the auxiliary CCU receives a contactless signal from the sink device, the auxiliary CCU is operative to drive the first connection HIGH to enable the first CCTU and to activate the pulldown circuitry.

According to embodiments discussed herein, the pulldown circuitry comprises a switch coupled to the AUX+ connection and the first connection; and a resistor coupled to the switch and ground, wherein the switch is ON when the first connection is asserted and the switch is OFF when the first connection is not asserted.

According to embodiments discussed herein, the resistor has a resistance value, and wherein the resistance value determines a type of the wired interface protocol to be established between the source and sink devices.

According to embodiments discussed herein, when the first CCTU is enabled, the first CCTU contactlessly transmits data to the sink device.

According to embodiments discussed herein, the plurality of connections further includes an auxiliary− connection that is not coupled to the controller.

According to embodiments discussed herein, the plurality of connections further includes a hot plug detect connection that is not coupled to the controller.

A method for establishing a communications link according to a wired interface protocol between a source device and a sink device, the method implemented in the sink device comprising a controller including first and second source detects, auxiliary contactless communication unit (CCU), and a contactless communication receiver unit (CCRU) comprising an output that is coupled directly to the first source detect and indirectly coupled to the second source detect via an inverter. The method includes enabling the auxiliary CCU to initiate beaconing; receiving, at the CCRU, a contactless signal from the source device; emulating a physical connection event by changing a signal on the output from LOW to HIGH in response to the received contactless signal, wherein the change in the signal on the output switches the signals applied to first and second source detects; contactlessly transmitting a hot plug detect signal, via the auxiliary CCU, to the source device; and completing establishment of the wired interface protocol between the sink and the source devices.

According to embodiments discussed herein, the establishment of the wired interface protocol is established without presence of any physical wired connection that conveys protocol signals between the sink and source devices.

According to embodiments discussed herein, prior to receiving the contactless signal from the source device, the output is LOW, and when the output is LOW the first source detect is LOW and the second source detect is HIGH.

According to embodiments discussed herein, when the output is HIGH, the first source detect is HIGH, and the second source detect is LOW.

According to embodiments discussed herein, the controller asserts the hot plug detect.

According to embodiments discussed herein, the first source detect is a source detect (n) and wherein the second source detect is a source detect (p).

A further understanding of the nature and advantages of the embodiments discussed herein may be realized by reference to the remaining portions of the specification and the drawings.

DETAILED DESCRIPTION

Figure 1:
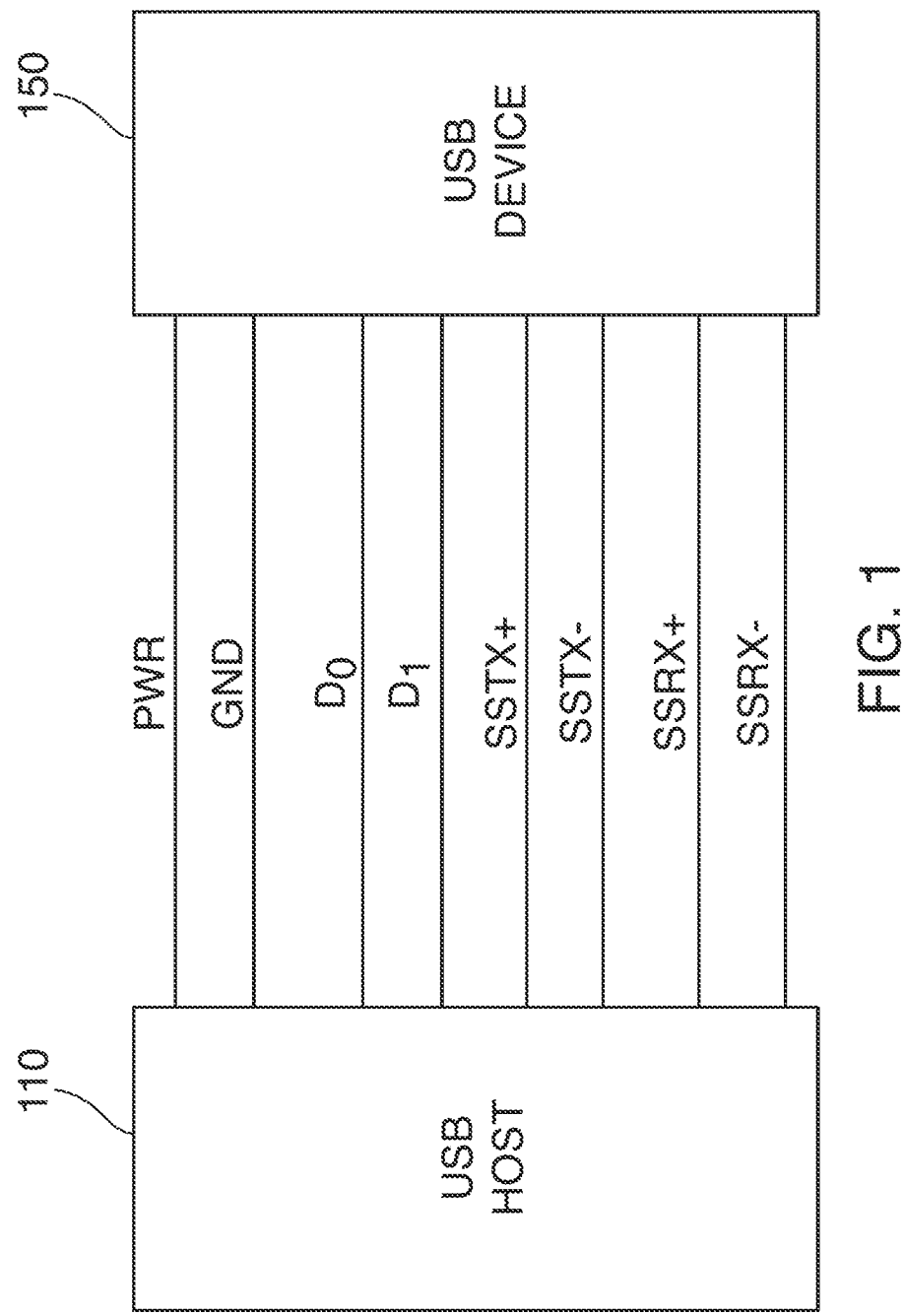
FIG. 1 shows a conventional USB hard-wired connection.

Illustrative embodiments are now described more fully hereinafter with reference to the accompanying drawings, in which representative examples are shown. Indeed, the disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of wireless communication between electronic devices and between sub-circuits within each device may be utilized in innovative and useful arrangements.

Such communication may occur between RF communication units, and communication at very close distances may be achieved using EHF frequencies (typically, 30-300 GHz) in an EHF communication unit. An example of an EHF communications unit is an EHF comm-link chip. Throughout this disclosure, the terms contactless communication unit (CCU), comm-link chip, and comm-link chip package are used to refer to EHF antennas embedded in IC packages. CCUs may be capable of contactlessly communicating data in the EHF frequency. CCUs may be capable of either transmitting data, receiving data, or both. For ease of reference herein, a CCTU may refer to a CCU that is configured to transmit data, and a CCRU may refer to a CCU that is configured to receive data. A CCTU may be paired with a CCRU to form a coupled pair, in which data is contactlessly transmitted from the CCTU (which is associated with a first device) to the CCRU (which is associated with a second device).

The term "transceiver" may refer to a device such as an integrated circuit (IC) including a transmitter and a receiver so that the integrated circuit may be used to both transmit and receive information, such as data. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to the implementing electromagnetic rather than electrical (wired, contact-based) connections and transport of signals between entities (such as devices). As used herein, the term "contactless" may refer to a carrier-assisted, dielectric coupling system which may have an optimal range dependant on several factors such as RF power, antenna design, RF channel design, and use of waveguides. In some embodiments, the range may between zero to five centimeter range without use of a waveguide. The connection may be validated by proximity of one device to a second device. Multiple contactless transmitters and receivers may occupy a small space. A contactless link established with electromagnetics may be point-to point in contrast with a wireless link which typically broadcasts to several points.

The RF energy output by the EHF transceivers described herein may be designed to adhere to various requirements mandated by one or more governments or their agencies. For example, the FCC may promulgate requirements for certification for transmitting data in a RF frequency band.

"Standards" and related terms such as "Standards-based", "Standards-based interfaces", "Standards-based protocol", and the like may refer to wired interface standards which may include but are not limited to USB (e.g., USB 2.0, USB 3.0, or USB OTG), DisplayPort ("DP"), Thunderbolt, HDMI, SATA/SAS, PCIe, Ethernet SGMII, Hypertransport, Quickpath, I2S, GPIO, I2C and their extensions or revisions. Each wired interface standard may be defined by a specification that defines, among other things, power sequencing timing rules, electrical and physical characteristics, and other information, for establishing a connection for that interface.

FIG. 1 shows a conventional USB 3.0 hard-wired connection existing between USB host 110 and USB device 150. As shown, several physical conductors (e.g., PWR, GND, D0, D1, SSTX+/−, and SSRX+/−) couple host 110 to device 150. The physical conductors enable wired interface protocols to operate according to the timing specifications required of the protocol with minimal or no issues. Other conventional wired connections such as DisplayPort (not shown) also have physical conductors that enable wired interface protocols to operate according to the timing specifications required thereof.

Embodiments discussed herein intentionally break the hard-wired data connection existing between two protocol controllers by replacing it with CCUs. That is, a coupled pair of CCUs replaces a hard-wired connection such that there is no longer an uninterrupted physical conductor directly coupling both device protocol controllers together. In some embodiments, a coupled pair can be used to replace each hard-wired data connection of the wired interface. In other embodiments, a coupled pair can be used to replace two or more hard-wired data connections. A consequence of injecting CCUs in place of a hard-wired connection is that the protocol controllers no longer directly control the power sequencing between the protocol controllers because they are not able to directly communicate with each other over the hard-wired data connections. Embodiments discussed herein use power sequence assist (PSA) circuitry that assists the protocol controllers in establishing a wired interface link in accordance with the specification of that wired interface despite the intentionally broken hard-wired data connection between the two controllers.

Protocols such as USB and DP depend on certain power sequencing prescribed in the respective protocols. These protocols assume that the links between the host and device are connected via a wired interface. If the wired interface is replaced with a contactless one, some of the assumptions for the protocol are broken. One instance is the termination or resistance value for the wired interface. When termination is applied on the connector, it is assumed that the host and device are both ready for communication. When the wired link is replaced with the contactless one, this assumption is broken. The host and device are de-coupled from one another. It is imperative for the contactless system to ensure that the host and device are ready when the termination is applied by the individual contactless units. If not, then the system may not function. The termination for each of the CCTUs must be applied such that the host termination is accurately reflected on the device side CCTU and that the device termination is accurately reflected on the host side CCTU.

PSA circuitry can be implemented in a multitude of different embodiments to account for the different wired interfaces, for variations in device implementation of a particular wired interface, and different system level implementations of the CCUs. Each variation of PSA circuitry can include at least one CCU. The inclusion of additional supporting circuitry can depend on the wired interface and class of system for which PSA circuitry is being used. Two system classes may exist: directed system and open system. In directed systems, both devices are specifically designed and constructed to operate according to a known wired interface and any particularities associated with the host and non-host devices. For example, both devices in a directed system may be designed to only communicate via USB wired interface and device specific parameters (e.g., power on time duration of the non-host device). That is, both the host device and the non-host device can only communicate with each other via USB when the specific parameters associated with those devices are met. In other words, if both sides of the system are not aware of the parameters of each other, no connection can be established. In open systems, one device does not require foreknowledge of the other device's parameters in order to establish a connection. In open systems, the CCUs may contain one or more state machines that are able to ascertain what the counterpart's capabilities and parameters are and can take the appropriate steps necessary to establish the appropriate communications link.

Figure 2:
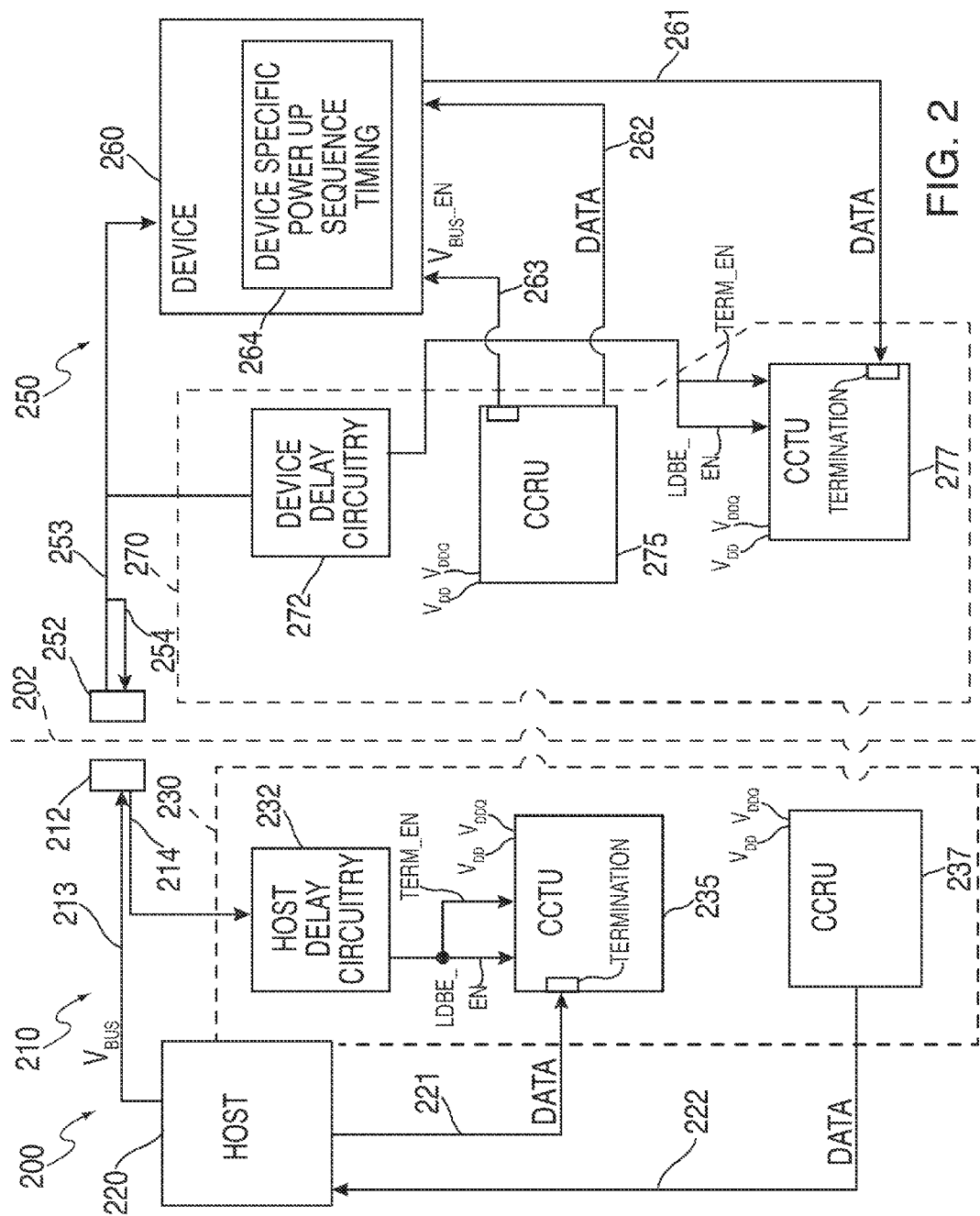
FIG. 2 shows an illustrative directed system, according to an embodiment.

FIG. 2 shows an illustrative directed state USB system 200 according to an embodiment. System 200 can include host device 210 and non-host device 250. A dashed line 202 provides an illustrative demarcation between devices 210 and 250. Device 210 can include coupling interface 212, host controller 220, and PSA circuitry 230, and device 250 can include coupling interface 252, device controller 260, and PSA circuitry 270. PSA circuitry 230 can include host delay circuitry 232, CCTU 235, and CCRU 237. PSA circuitry 270 can include device delay circuitry 272, CCRU 275, and CCTU 277. Coupling interface 212 can represent a physical interface that mechanically and/or electrically couples to coupling interface 252 during, for example, a docking event. Coupling interface 212 may be coupled to host device 210 via line 213. Line 213 may be a power bus such as Vbus that represents power supplied from host device 210. Line 213 may convey power to line 253 when coupling interfaces are coupled together, thereby providing power to device 250. Coupling interface 212 can include feedback line 214, which is coupled to host delay circuitry 232. Feedback line 214 may carry a signal to host delay circuitry 232 in response to a coupling event between interfaces 212 and 252. For example, feedback line 214 may return a signal existing on line 253 (e.g., Vbus after mechanical interfaces 212 and 252 are coupled). As another example, power and sensors (not shown) can be used to trigger host delay circuitry 232 or to enable CCTU 235. In some embodiments, host delay circuitry 232 is optional.

Host controller 220 may have data line 221 coupled to CCTU 235. Data line 221 may be a differential or single ended signal line and can represent an outbound data line that would ordinarily be directly coupled to device controller 260 via a physical conductor. In particular, in a wired USB interface, data line 221 would be directly coupled to device controller 260. Host controller 220 may also have data line 222 coupled to CCRU 237. Data line 222 may be a differential or single ended signal line and can represent an inbound data line that would ordinarily be directly coupled to device controller 260 via a physical conductor. In particular, in a wired USB interface, data line 222 would be directly coupled to device controller 260.

Host delay circuitry 232 includes a timer that delays assertion of one or more pins on CCTU 235 for a fixed period of time after a feedback signal is received from coupling interface 212. The fixed period of time may be approximately or exactly the same as the time required by device controller 260 to complete its power on sequence. The power up sequence timing may be device controller specific and can vary from one class of non-host devices to another. For example, a first class of non-host devices may need 300 ms to complete a power up sequence, whereas a second class of non-host device may need 2 seconds to complete a power up sequence. The time duration of these power up sequences are entirely device dependent. The power up sequence timing specific device controller 260 is illustratively shown in box 264.

The CCTU pins that are asserted following expiration of the timer in host delay circuitry 232 may be the LDBE and termination enable pins (or other suitable pins existing as part of the CCU IC package). Assertion of the LDBE pin may enable CCTU 235 to begin contactlessly transmitting data to CCRU 275. Assertion of the termination enable pin may cause CCTU to turn on its termination, which is coupled to data line 221 of host controller 220. Activating the CCTU termination can inform host controller 220 that a non-host device is connected. As will be explained in more detail, the synchronization of the terminations of both CCTUs 235 and 277 are necessary for complying with the power sequencing rules of the USB wired interface.

CCTUs 235 and 277 and CCRUs 237 and 275 may be powered up via power pins Vdd and Vddq (as shown). On host device 210, CCTU 235 and CCRU 237 may be continually powered whenever host controller 220 is providing power on power bus 213. On non-host device 250, CCRU 275 and CCTU 277 can be powered up when interfaces 212 and 252 are coupled together, and when host device 210 is supplying power on power bus 213.

Coupling interface 252 may be coupled to device controller 260 and PSA circuitry 270 (device delay circuitry 272 in particular) via power bus 253. Feedback line 254 may be coupled to interface 252 and power bus 253.

Device controller 260 may have data line 261 coupled to CCTU 277. Data line 261 may be a differential or single ended signal line and can represent an outbound data line that would ordinarily be directly coupled to host controller 210 via a physical conductor. In particular, in a wired USB interface, data line 261 would be directly coupled to host controller 210. Device controller 260 may also have data line 262 coupled to CCRU 275. Data line 262 may be a differential or single ended signal line and can represent an inbound data line that would ordinarily be directly coupled to host controller 210 via a physical conductor. In particular, in a wired USB interface, data line 262 would be directly coupled to host controller 210. Vbus_enable line 263 can be coupled to CCRU 275. Vbus_enable line 263 may be asserted to inform device controller 260 that it has docked to another device (e.g., host device 210). In a conventional wired USB interface, Vbus_enable line 263 would ordinarily be coupled to power bus 253.

Device delay circuitry 272 includes a timer that can delay assertion of one or more pins on CCTU 277 for a fixed period of time after power is provided on power bus 253 via interface 252. The fixed period of time may be approximately or exactly the same as the time required by device controller 260 to complete its power on sequence. In some embodiments, device delay circuitry 272 can be triggered by stimuli other than power such as a sensor detection event (e.g., magnetic hall sensor or light sensors). The CCTU pins that are asserted following expiration of the timer in device delay circuitry 272 may be the LDBE and termination enable pins. Assertion of the LDBE pin may enable CCTU 277 to begin contactlessly transmitting data to CCRU 237. Assertion of the termination enable pin may cause CCTU to turn on its termination, which is coupled to data line 261 of device controller 260. Activating the CCTU termination can inform device controller 260 that it is connected to a host device.

The fixed period of time for both host delay circuitry 232 and device delay circuitry 272 may be approximately the same. Since a docking event between interfaces 212 and 252 can trigger a start of both timers in delay circuitry 232 and 272, this ensures that the terminations of both CCTUs 235 and 277 are synchronized, to thereby reproduce the termination sequence of a conventional mechanical interface connection, and to comply with the power sequencing rules of the USB wired interface. As defined herein, a docking event can be physical coupling between interface 212 and 252 or can be a proximity coupling where interface 212 and 252 are positioned within range of each other to communicate.

In addition, the Vbus_enable is asserted within the timing constraints by the power sequencing rules of the USB wired interface. Vbus_enable can be asserted when CCTUs 235 and 277 and CCRUs 237 and 275 are linked and synchronized.

Figure 3:
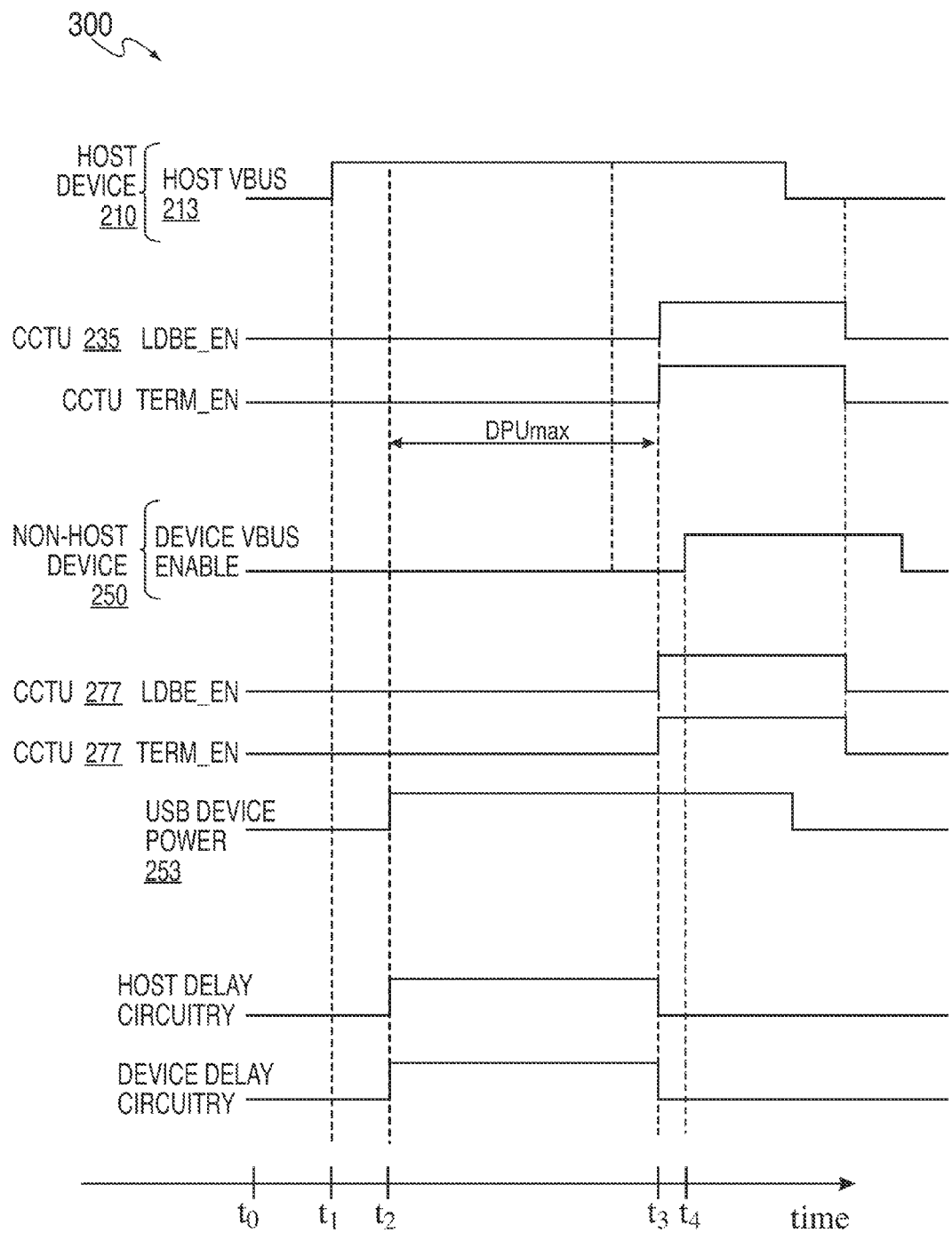
FIG. 3 shows an illustrative power up sequence timing diagram for USB super speed using a directed system, according to an embodiment.

FIG. 3 shows an illustrative power up sequence timing diagram 300 for USB super speed using USB system 200, according to an embodiment. As shown, timing diagram 300 shows how various components of USB system 200 are driven over time to establish a USB link between host device 210 and non-host device 250. Starting at time, t1, host Vbus line 213 goes HIGH. At time, t2, a plug event occurs in which host device 210 is coupled to non-host device 250 via coupling interfaces 212 and 252. The plug event connects Vbus line 213 to power bus 253 thereby triggering the start of a power up sequence of device controller 260 and the start of timers in host delay circuitry 232 and device delay circuitry 272. It should be understood that the plug event may involve different connections depending on the coupling configuration used for interfaces 212 and 252. For example, if the coupling configuration uses pogo pins or other direct power conducting mechanism, power can be transmitted from Vbus line 213 to power bus 253. However, if the coupling uses a sensor or magnets, power may not be transferred in the same way. Sensor or magnet couplings may rely on an external power source (not shown). If an external power source is used, this power source may be used to power CCRU 275 and CCTU 277 in lieu of any power provided via interface 212.

The power up sequence of device controller 260 (shown as DPUmax) may run from time, t2, to time t3, at which point the power up sequence is complete. The timers of delay circuitry 232 and 272 may also have run their course at time, t3. After the timers expire, they send signals to their respective CCTUs to assert the LDBE and termination_enable pins. Thus, at time, t3, LDBE and termination_enable pins on CCTUs 235 and 277 are driven HIGH at approximately the same time. This way, both host controller 220 and device controller 260 are provided with termination resistance on their respective data lines 221 and 261 within the timing requirements of the USB specification. At time, t4, CCRU 275 can assert the Vbus_enable pin on device controller 260 through signal line 263. CCRU 275 may assert this pin in response to receiving a contactless signal from its counterpart CCU, CCTU 235. CCTU 235 was enabled to transmit contactless signals once its LDBE pin was asserted.

At time, t4, host device 210 and non-host device 250 are communicating with each other in accordance with the USB superspeed protocol. PSA circuitry 230 and PSA circuitry 270 controlled the timing of terminations and device Vbus_enable to comply with the timing requirements of the USB specification.

Figure 4:
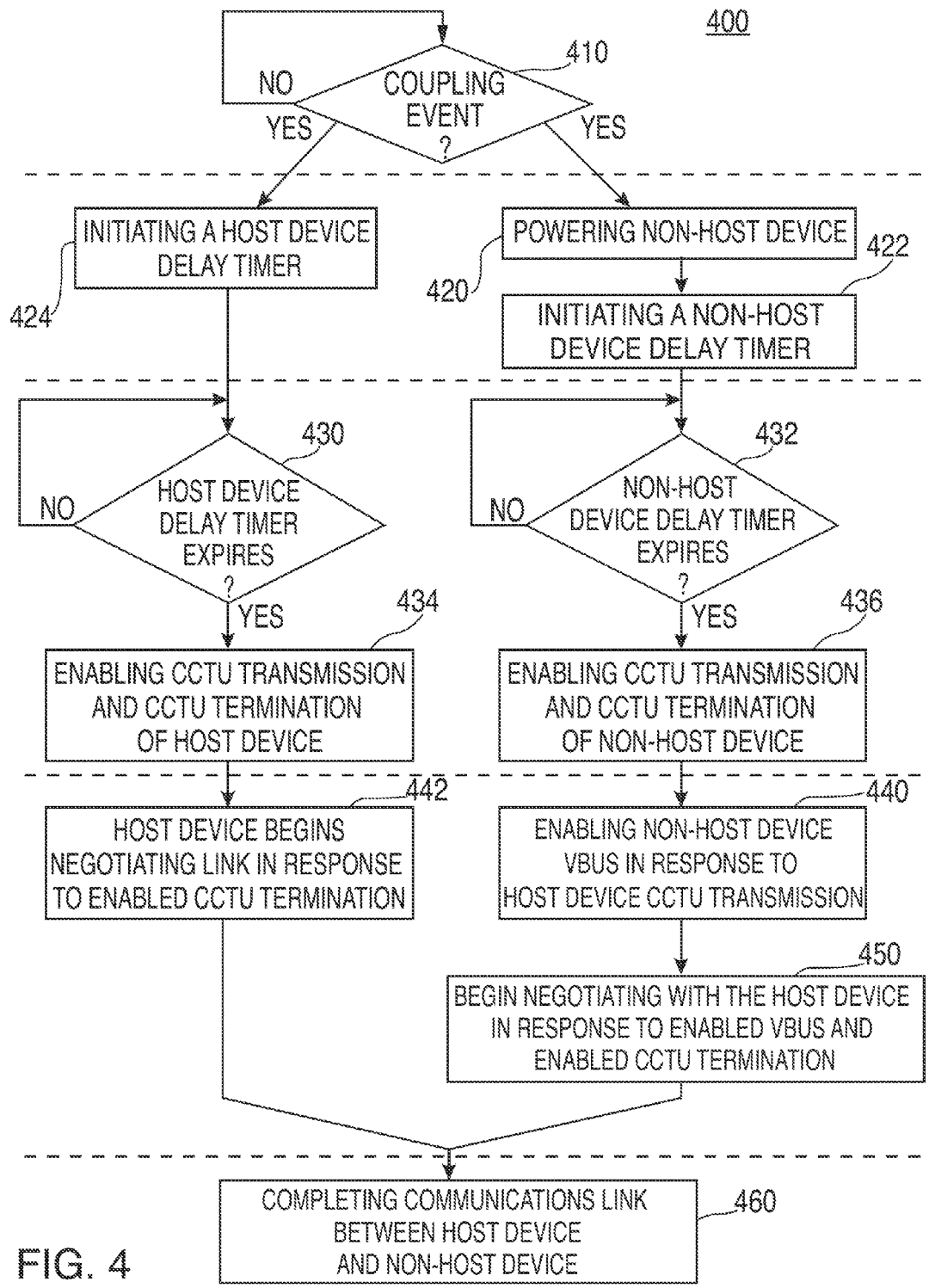
FIG. 4 shows an illustrative process for controlling the power up sequence of a directed system, according to an embodiment.

FIG. 4 shows an illustrative process 400 for controlling the link establishment sequence of a directed USB system, according to an embodiment. The directed USB system can include a host device and a non-host device that communicate with each other according to a wired interface protocol. FIG. 4 shows that certain process steps occur in parallel for both the host device and the non-host device. Horizontal dashed lines appear in several locations to demarcate different times where both the host device and non-host device synchronize execution of one or more steps. Starting at step 410, a determination of whether a coupling event has occurred in which power is supplied from a host device to a non-host device. If the determination is NO, process 400 loops back to start of step 410. If the determination is YES, a non-host device is powered up at step 420. For example, device controller (e.g., controller 260) of non-host device may be powered up. The device controller can be characterized by a power up sequence time period (shown, in FIG. 3 as DPUmax). At step 422, a host device delay timer having a first delay time period that is substantially the same as the power up sequence time period can be initiated. At step 424, a non-host device delay timer having a second delay time period that is substantially the same as the power up sequence time period can also be initiated.

At step 430, a determination is made as to whether the host device timer has expired. At step 432, a determination is made as to whether the non-host device timer has expired. If the determination is NO for either of steps 430 and 432, process 400 continues to loop back to one of steps 430 and 432. When the determination at step 430 is YES, process 400 proceeds to step 434, in which CCTU contactless transmission and CCTU termination of the host device are enabled. For example, CCTU 235 may begin contactlessly transmitting data to CCRU 275 and enable its termination in response to expiration of host delay circuitry 232. When the determination at step 432 is YES, process 400 proceeds to step 436, in which CCTU contactless transmission and CCTU termination of the non-host device are enabled. For example, CCTU 277 may begin contactlessly transmitting data to CCRU 237 and enable its termination in response to expiration of non-host delay circuitry 272. The enabling of the CCTU transmissions and terminations of the host device and non-host device CCTUs are timely performed to comply with timing sequence requirements of the wired interface protocol.

At step 440, the non-host Vbus is enabled in response to receipt of a host device CCTU contactless transmission. For example, when CCRU 275 receives a contactless signal from CCTU 235, CCRU 275 enables a Vbus_enable pin of device controller 260. At step 442, the host device may begin negotiating a link in response to the enabled CCTU termination. For example, when the termination of CCTU 235 is activated, host 220 is made "aware" of the "contactless connection" with non-host device 260 and imitates the USB link sequence. At step 450, with enablement of Vbus, the non-host device is turned ON, and once it is turned ON, it detects the enabled CCTU 277 termination and begins negotiating with the host device. For example, when the termination of CCTU 277 is enabled and Vbus is enabled, non-host device 260 is made "aware" of the "contactless connection" with the host device 220. The timing sequence of the CCTU transmissions and the CCTU termination enablement are such that they are within the timing sequence requirements of the USB wired interface protocol. If the host sees termination and the device does not respond, the host can disable the link. Thus, to ensure compliance with the wired interface protocol, the non-host device should have its Vbus enabled within a fixed period of time after the host device CCTU has had its termination enabled. At step 460, the communications link can be completed between the host device and the non-host device.

It should be understood that the steps shown in FIG. 4 are merely illustrative and that additional steps may be added, rearranged, or that steps may be omitted. For example, a step may be added to specify that the host device and non-host device can contactlessly communicate with each other in accordance with the wired interface protocol after terminations are enabled and the Vbus_enable has been asserted.

Figure 5:
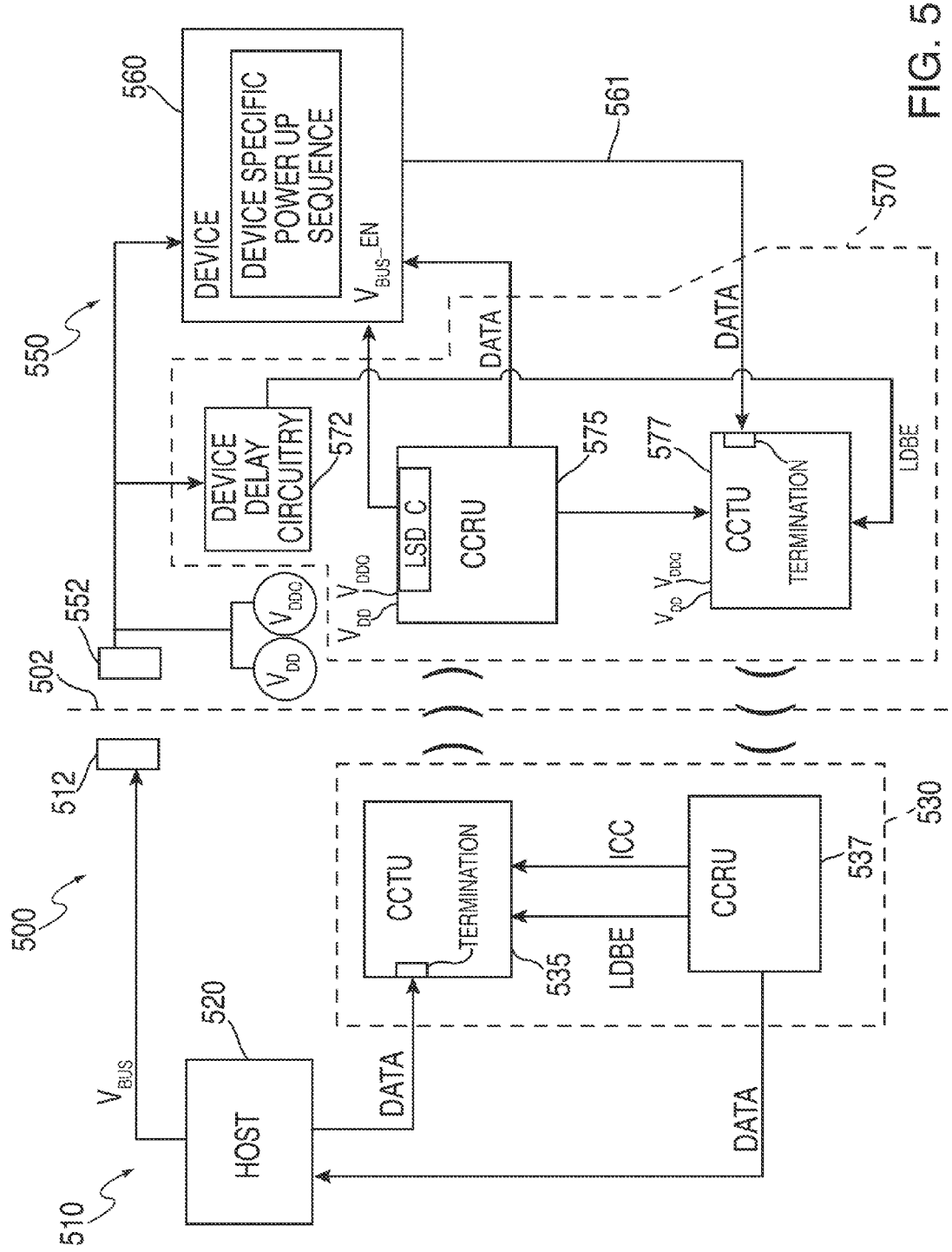
FIG. 5 shows an illustrative automatic system that uses a power dock, according to an embodiment.

FIG. 5 shows an illustrative automatic USB system 500 that uses a power dock, according to an embodiment. System 500 can include host device 510 and non-host device 550. Non-host device 550 may sometimes be referred to herein as a peripheral device. A dashed line 502 provides an illustrative demarcation between devices 510 and 550. Device 510 can include coupling interface 512, host controller 520, and PSA circuitry 530, and device 550 can include coupling interface 552, non-host device controller 560, and PSA circuitry 570. PSA circuitry 530 can include CCTU 535 and CCRU 537. PSA circuitry 530 can include non-host device delay circuitry 572, CCRU 575, and CCTU 577. Interface 512 can represent a physical interface that mechanically and/or electrically couples to interface 552 during, for example, a docking event. In some embodiments, interface 512 can include sensor that detects a coupling but does not transmit power. In such an embodiment, power can transferred wirelessly or via another means other than interface 512.

In system 500, power can be provided to non-host device via the mechanical interface coupling of mechanical interfaces 512 and 552. In addition, the mechanical coupling serves as a trigger for initiating the power up sequence of device controller 560 and for initiating the delay timer in delay circuitry 572. Device controller 560 may have a specific power up timing sequence that spans a fixed period of time. The delay timer in delay circuitry 572 may span the same fixed period of time as the power up timing sequence of controller 560. After the delay timer expires, it can drive the LDBE pin in CCTU 577 HIGH, which starts a contactless link establishment process involving CCTU 577, CCRU 537, CCTU 535, and CCRU 575. The non-host device can control link establishment by specifying which protocol to use and the host device can automatically switch between different protocols to comply with the non-host device's specified protocol.

The contactless link may be established by having each CCU progress through a series of steps controlled by one or more state machines that are being implemented in each CCU. The state machine(s) may be referred to herein as progression of consciousness ("POC") state machine(s), which are discussed in greater detail below, principally in connection with the description associated with FIGS. 11-14. The POC state machines enable the CCUs to communicate with each other and control when to enable the terminations of CCTU 535 and 577, and when to enable Vbus_enable in controller 560. The POC state machines eliminate the need to coordinate delay timers on both the host and devices, as required in directed system 200. As a result, there is no need for separate delay circuitry to be included in host device 510 to coordinate enablement of the termination on the data line coupled to CCTU 535 with the termination of the data line coupled to CCTU 577 because the POC state machines make this determination. Moreover, because the POC state machines collectively determine when to turn on the terminations and the non-host controller's Vbus_enable, any number of different classes of non-host devices (e.g., devices having different power up sequence times) may establish a USB link with host device 510.

Figure 6:
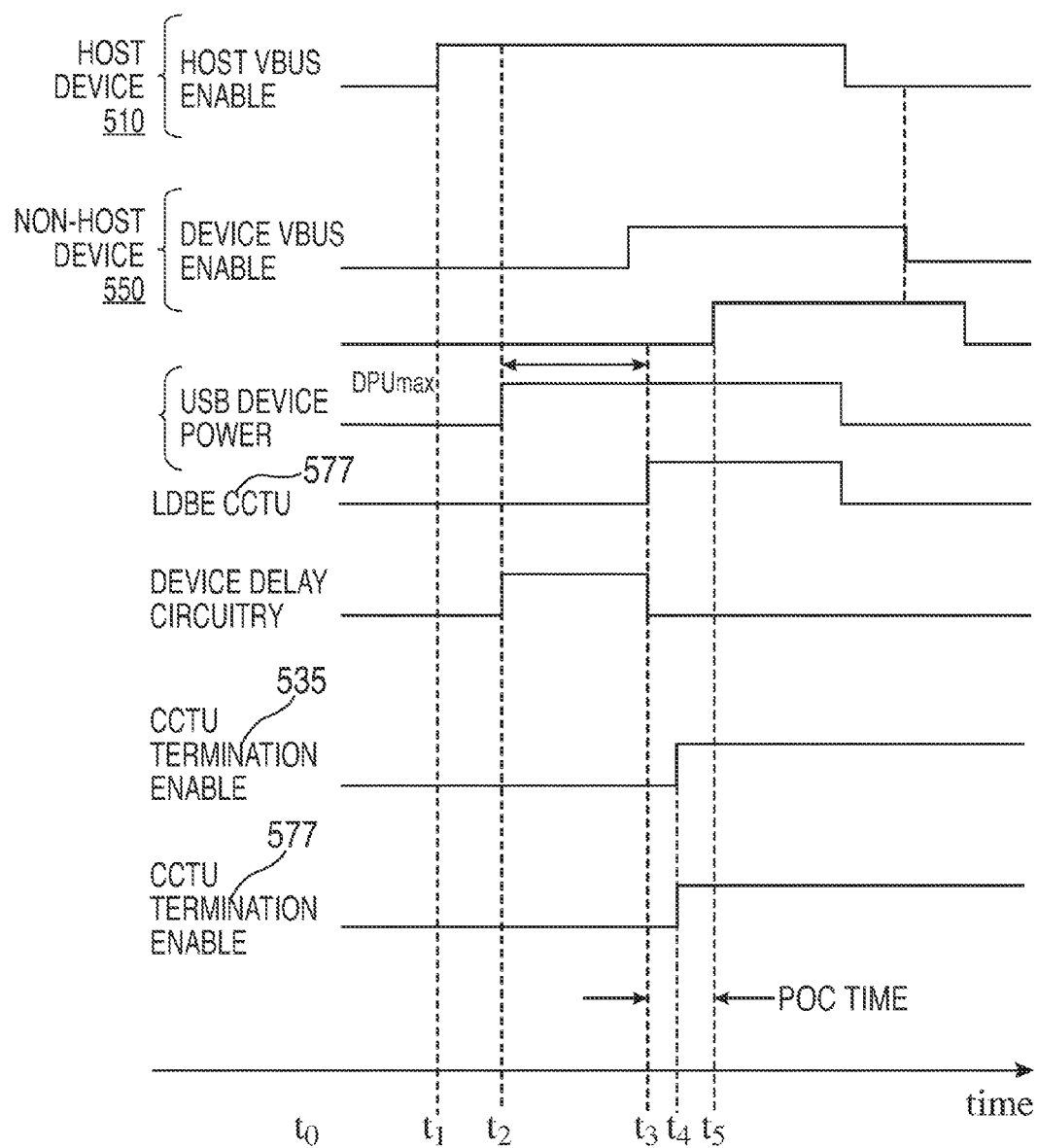
FIG. 6 shows an illustrative power up sequence timing diagram for the system of FIG. 5, according to an embodiment.

FIG. 6 shows an illustrative power up sequence timing diagram 600 for USB super speed using USB system 500, according to an embodiment. As shown, timing diagram 500 shows how various components of USB system 500 are driven over time to establish a USB link between host device 510 and non-host device 550. Starting at time, t1, host Vbus goes HIGH. At time, t2, a docking event occurs in which host device 510 is coupled to non-host device 550 via interfaces 512 and 552. The docking event can connect Vbus to the power bus of non-host device 550 thereby triggering the start of a power up sequence of controller 560 and the start of the timer in delay circuitry 572. It should be appreciated that the docking event can embody scenarios whereby a coupling between the host device and the non-host device is detected, but there is no transfer of power from the host device to the non-host device.

The power up sequence of controller 560 may run from time, t2, to time t3, at which point the power up sequence is complete. This is shown as DPUmax. The timer of delay circuitry 572 may also have run its course at time, t3. After the timer expires, it can assert the LDBE on CCTU 577. At time, t3, the POC state machines commence, and at time, t4, the state machines enable the terminations on CCTU 535 and 577. This way, both host controller 520 and peripheral controller 560 are provided with termination resistance on their respective data lines within the timing requirements of the USB specification. Then, at time, t5, the state machines instruct CCRU 535 to assert Vbus_enable on device controller 560. This way, both host controller 520 and device controller 560 are provided with termination resistance on their respective data lines 522 and 561 within the timing requirements of the USB specification. At time, t4, CCRU 575 can assert the Vbus_enable pin on device controller 560 within the timing requirements of the USB specification. After time, t5, host device 510 and non-host device 550 are able to communicate data according to a wired USB interface.

Figure 7:
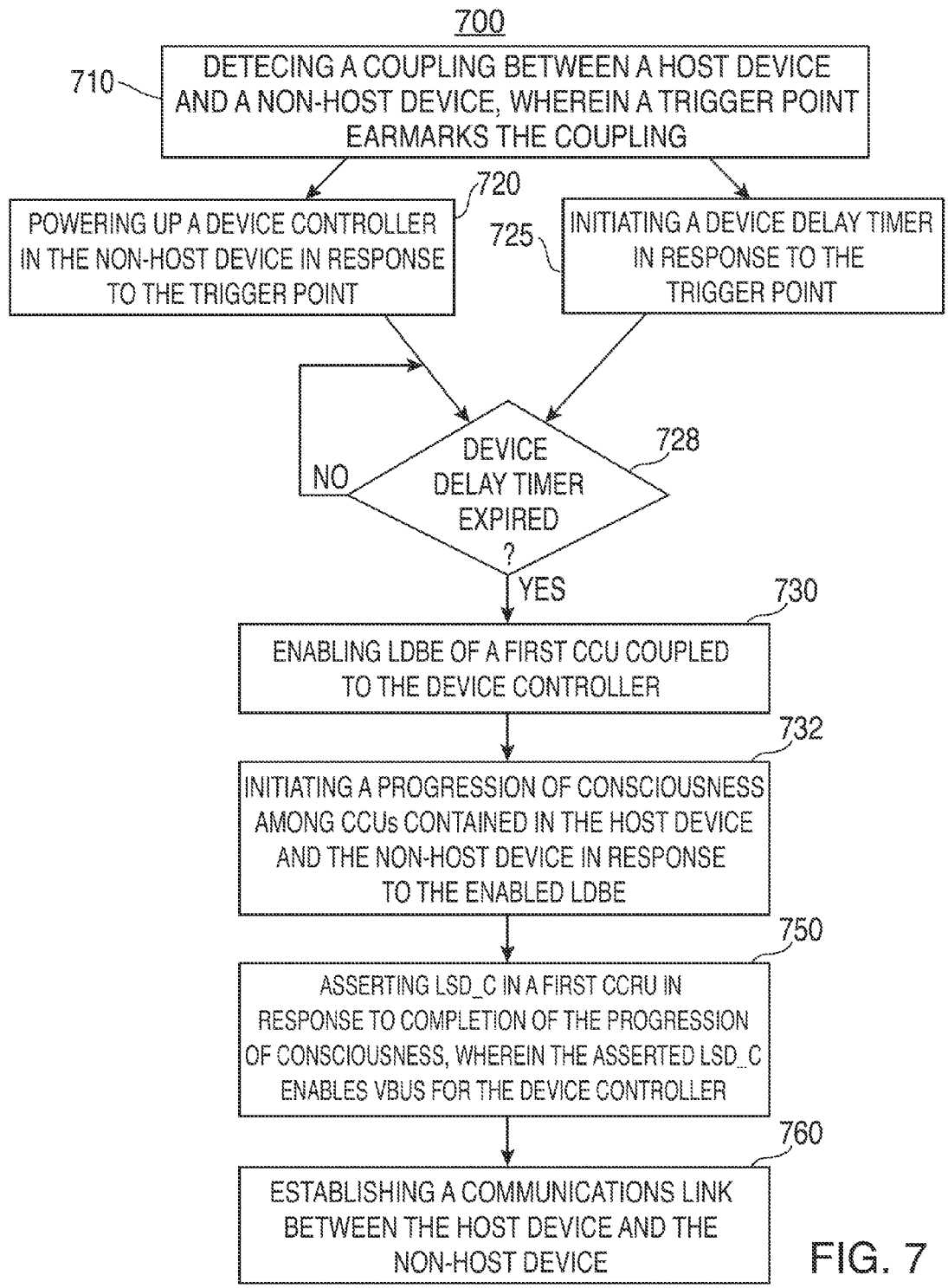
FIG. 7 shows an illustrative process for controlling the power up sequence of an automatic non-host device that requires power to be transferred from host device, according to an embodiment.

FIG. 7 shows an illustrative process 700 for controlling the power up sequence of an automatic non-host device that requires power to be transferred from host device, according to an embodiment. The host device and the non-host device can communicate with each other according to a wired interface protocol. Starting at step 710, a coupling between a host device and a non-host device can be detected, wherein a trigger point earmarks the coupling. In one embodiment, the coupling can occur when the host device starts providing power to the non-host device. At step 720, at the trigger point, a controller is powered up, wherein the controller is characterized by a power up sequence time period. At step 725, at the trigger point, a delay timer may be initiated. The delay timer may have a delay time period that is substantially the same as the power up sequence time period. Steps 720 and 725 may be performed in parallel. When the delay timer expires at step 728, LDBE of a first CCTU coupled to the controller can be enabled, as indicated by step 730. In addition, the termination of the first CCTU coupled to the device can also be enabled at an end of the delay time period.

At step 732, a POC can be initiated among the CCUs contained in the host device and the non-host device in response to the enabled LDBE. For example, during the POC, CCTU 577, CCRU 537 CCTU 535, and CCRU 575 begin establishing a contactless link among themselves to enable contactless communications between the host device and the non-host device. During the POC, the termination of the host device's CCTU (e.g., CCTU 535) may be enabled. For example, in FIG. 6, the termination of the host device's CCTU can be enabled at time, t4, which is within the POC time. When the POC is complete, a first CCRU (e.g., CCRU 575) may assert one of its pins (shown as LSD_C), wherein the asserted LSD_C pin enables Vbus of the controller (e.g., controller 560), as indicated by step 750. The enabling of the terminations (of the CCTUs in the host and non-host devices) and the asserting of the Vbus_enable are timely performed to comply with timing sequence requirements of a wired interface protocol. At step 760, a communications link is established between the host and the non-host device.

It should be understood that the steps shown in FIG. 7 are merely illustrative and that additional steps may be added, rearranged, or that steps may be omitted. For example, a step may be added to specify that a termination associated with the host device is enabled within the timing sequence required by the wired interface protocol.

Figure 8:
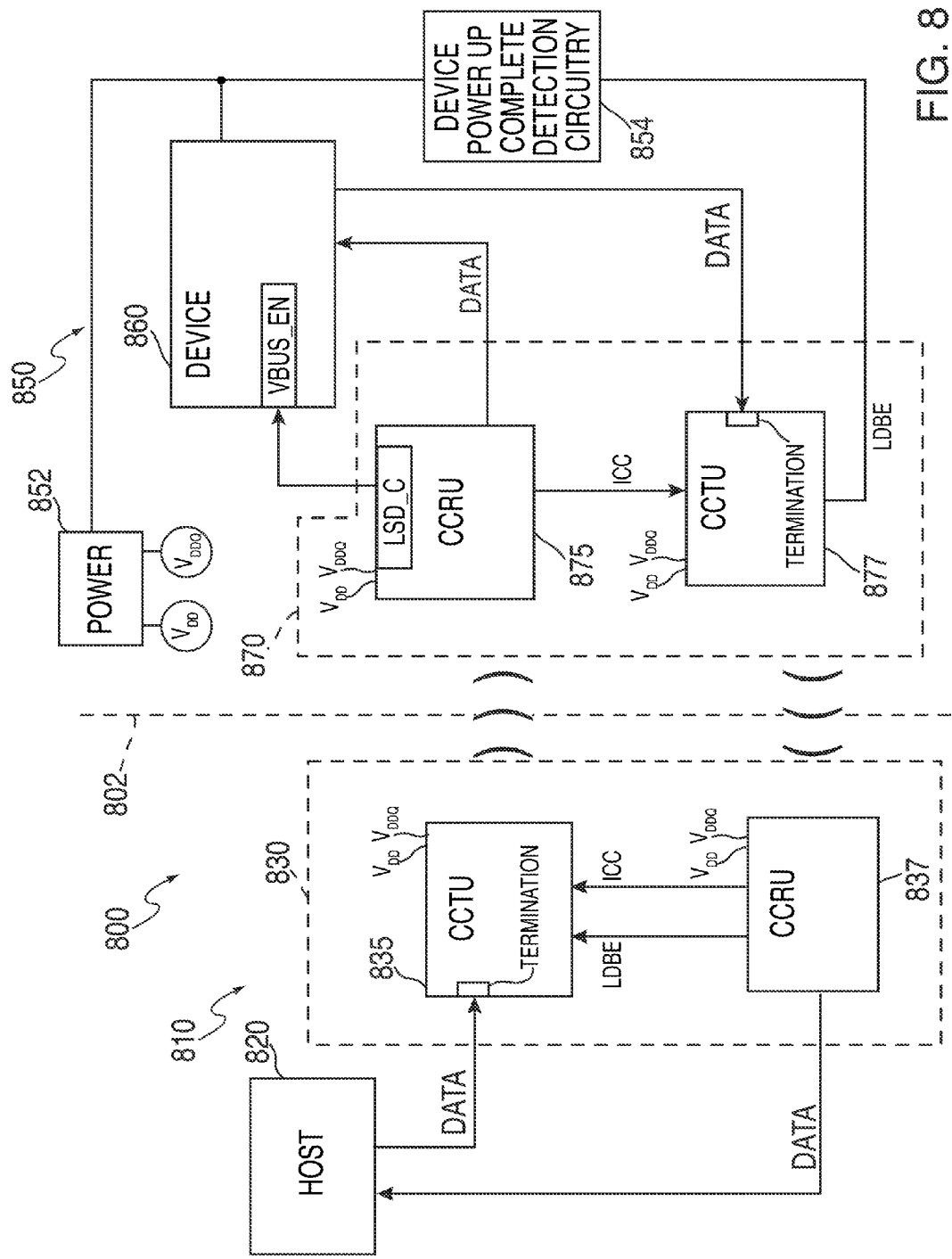
FIG. 8 shows an illustrative automatic self-powered system, according to an embodiment.

FIG. 8 shows an illustrative automatic self-powered USB system 800, according to an embodiment. System 800 can include host device 810 and non-host device 850. System 800 is similar in many respects to system 500, but differs in that there are no mechanical interfaces for transferring power from one device to another. In system 800, both host device 810 and non-host device are independently powered by their own respective power sources (not shown). A dashed line 802 provides an illustrative demarcation between devices 810 and 850. Host device 810 can include host controller 820 and PSA circuitry 830, and device 850 can include power 852, device power up complete detection circuitry 854, controller 860 and PSA circuitry 870. PSA circuitry 830 can include CCTU 835 and CCRU 837. PSA circuitry 870 can include CCRU 575 and CCTU 577. Another difference between system 800 and system 500 is that delay circuitry 572 is omitted in system 800. Delay circuitry 572 is not needed in system 800 because there is no mechanical coupling event tied to receipt of power.

In system 800, both device 810 and 850 are self-powered. As a result, host controller 820, CCTU 835 and CCRU 837 are powered up when host power bus (not shown) is HIGH, and controller 860, CCRU 875 and CCTU 877 are powered up when non-host power bus is HIGH. The LDBE pins on both CCTU 835 and CCTU 877 may be asserted so that both CCTUs can beacon search for their respective counterpart units (e.g., CCRU 875 for CCTU 835 and CCRU 837 for CCTU 877). In device 850, power up complete detection circuitry 854 may detect when controller 860 has completed its power up sequence. When the power up sequence of controller 860 is complete, circuitry 854 may assert the LDBE pin on CCTU 877. When devices 810 and 850 are placed in contactless coupling proximity of each other, the POC state machines in the CCU may advance through their states to establish a contactless link. During the establishment of this link, the POC state machines can coordinate activation of the terminations of CCTU 835 and CCTU 877 and assertion of the Vbus_enable pin (via CCRU 875) on peripheral device controller 860 in a manner similar to that previously described above in connection with system 500. As such, the advantages realized in system 500 are also realized in system 800.

Figure 9:
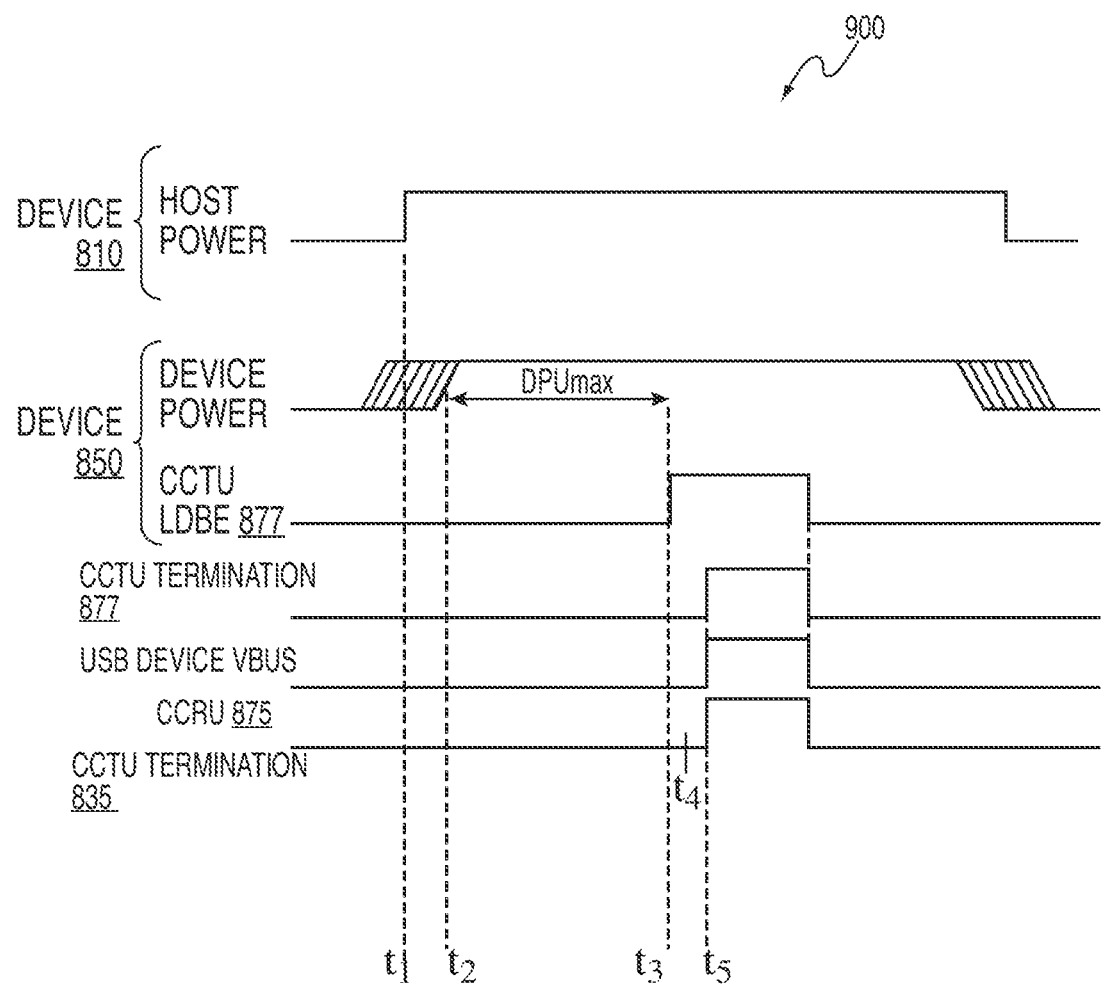
FIG. 9 shows an illustrative power up sequence timing diagram for the system of FIG. 8, according to an embodiment.

FIG. 9 shows an illustrative power up sequence timing diagram 900 for USB super speed using USB system 800, according to an embodiment. As shown, timing diagram 900 shows how various components of USB system 800 are driven over time to establish a USB link between host device 810 and non-host device 850. Starting at time, t1, host device power goes HIGH. At time, t2, device power 852 goes HIGH, thereby powering controller 860 and CCRU 875 and CCTU 877. At time, t3, when the power up sequence of controller 860 is complete, the LDBE pin may be asserted for CCTU 877 to initiate a beaconing sequence for non-host device 850. The beaconing sequence may represent a start of a POC. At time, t4, devices 810 and 850 may be placed in contactless signal transfer proximity of each other sufficient for establishing a contactless link, at which point the POC can advance beyond beaconing and complete the contactless link among the CCUs of the host device and the non-host device. At time, t5, the terminations on CCTU 877 and CCTU 835 are simultaneously activated, and CCRU 875 asserts Vbus_enable on controller 860 within the USB specification. After time, t5, host device 810 and non-host device 850 are able to communicate data according to a wired USB interface.

Figure 10:
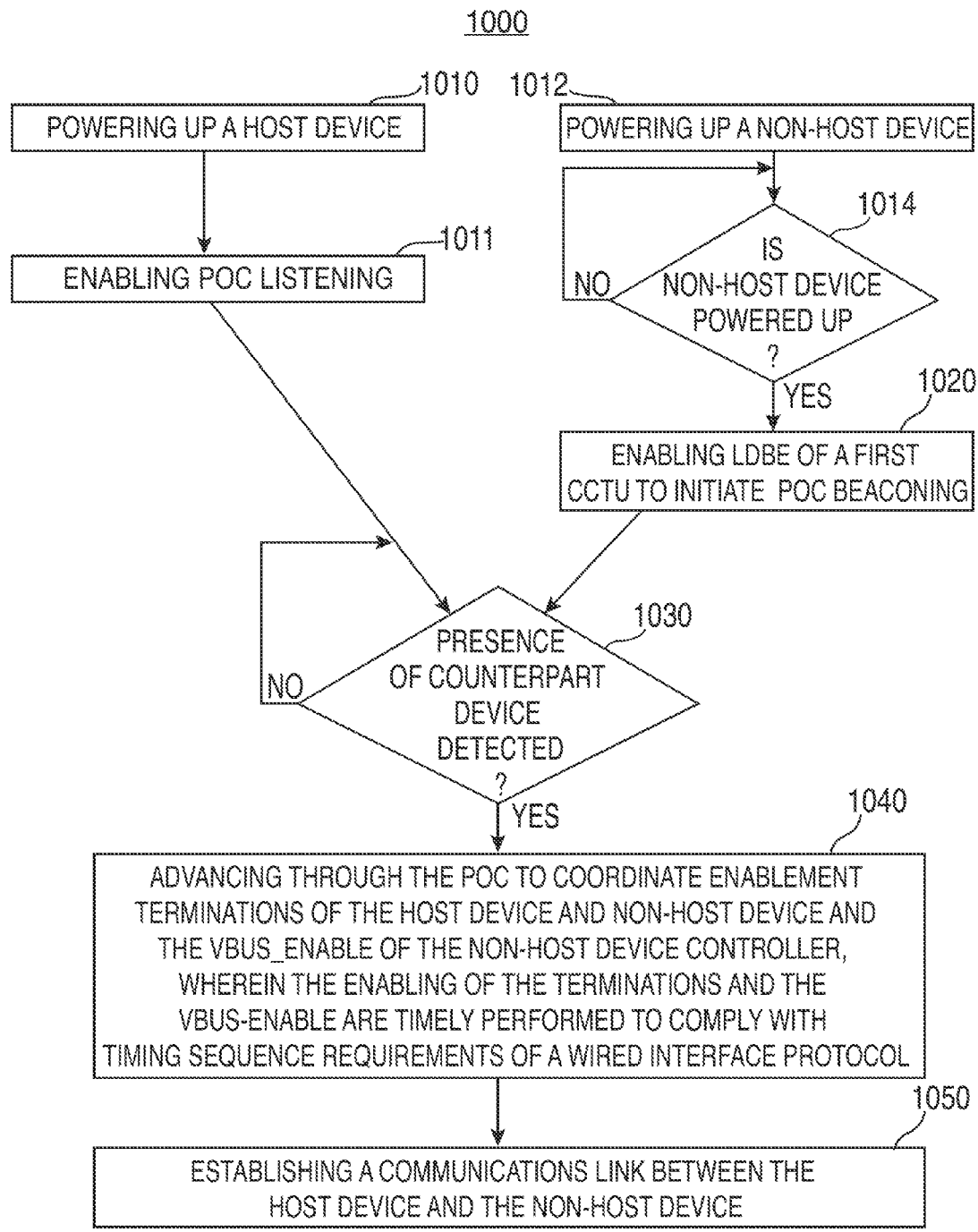
FIG. 10 shows an illustrative process for controlling a power sequence of an automatic contactless communication non-host device that communicates with a host device according to a wired interface protocol.

FIG. 10 shows an illustrative process 1000 for controlling a power up sequence of an automatic system contactless communication non-host device that communicates with a host device according to a wired interface protocol. The non-host device can include a controller. Starting at step 1010, a host device is powered up and at step 1012, a non-host device is powered up. At step 1014, a determination is made as to whether the non-host device is powered up. For example, power up complete detection circuitry 854 may make this determination. If the determination is YES, process 1000 can proceed to step 1020, otherwise, if the determination is NO, process 1000 can loop back to step 1014. At step 1020, LDBE of a first CCTU (e.g., CCTU 877) may be enabled to initiate POC beaconing. At step 1011, the host device may enable POC listening. This way, both the host device and non-host device can monitor for the presence of each other such that when they are brought within contactless communications range of each other, contactless communications can commence.

At step 1030, a determination is made on whether counterpart devices are within contactless communications presence of each other. If the determination is NO, process 1000 can return to step 1030. If the determination is YES, process 1000 may proceed to step 1040. At step 1040, the CCUs of both the host and non-host device may advance through the POC to coordinate enablement of the terminations of the CCTUs in the host and non-host devices and the Vbus_enable of the non-host device controller, wherein the enabling of the terminations and the asserting of the Vbus_enable are timely performed to comply with timing sequence requirements of the wired interface protocol. Because the POC dictates when the terminations and Vbus_enable are enabled, the timing requirements of the wired interface protocol are easily met. At step 1050, a communications link can be established between the host device and the non-host device.

It should be understood that the steps shown in FIG. 10 are merely illustrative and that additional steps may be added, rearranged, or that steps may be omitted. For example, a step may be added to specify that a termination associated with the host device is enabled within the timing sequence required by the wired interface protocol.

Figures 11, 12:
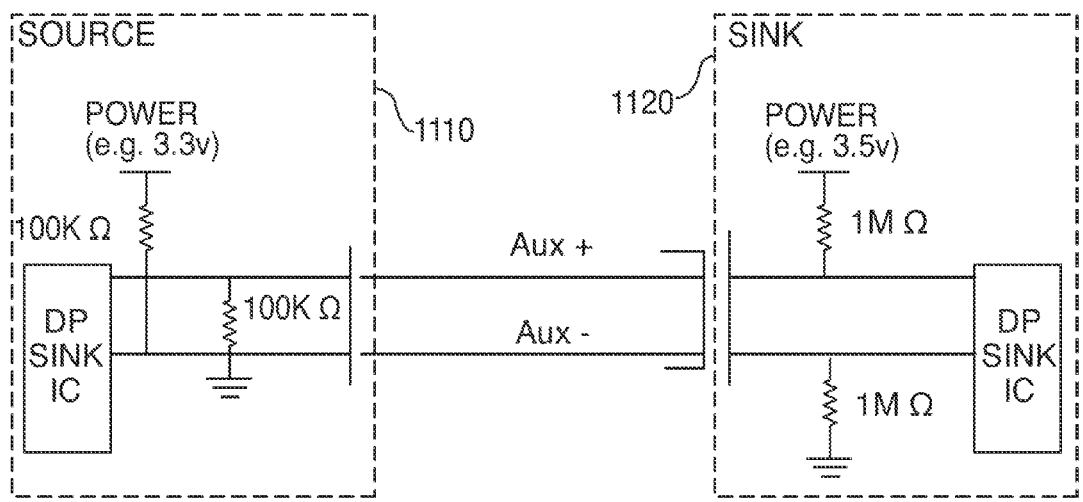
FIG. 11 shows a conventional DisplayPort for standard wired docking.
FIG. 12 shows a table of AUX+ and AUX− states of both the source and the sink when connected and not connected, according to an embodiment.

FIGS. 11-16 are now referenced to discuss DisplayPort embodiments. In particular, FIG. 11 shows a conventional DisplayPort for standard wired docking. FIG. 12 shows a table of AUX+ and AUX- states of both the source and the sink when connected and not connected.

Referring now to FIG. 11, a standard DP cable dock 1100 includes source side 1110 and sink side 1120. When source side 1110 and sink side 1120 are decoupled, the following conditions are present: on sink side 1120, the signal AUX+ is pulled up to the voltage level (e.g., 3.3V) supplied by the POWER by a 1 MOhm resistor the signal AUX- is pulled down to GND by a 1 MOhm resistor; on source side, the signal AUX+ is pulled down to GND by a 100 KOhm resistor and the AUX- is pulled up to the voltage level (e.g., 3.3V) supplied by POWER by a 100 KOhm resistor. These conditions are also represented in self-explanatory FIG. 12. Thus, when there is no physical connection between the source and sink, the sink side measures the power supplied voltage on the AUX+ signal and GND on the AUX- signal. This indicates that there is no source present. When source side 1110 and sink side 1120 are coupled (e.g., via a cable or other connection), sink side 1120 will measure GND on the AUX+ channel (because the 100 KOhm resistor is much smaller than the 1 MOhm resistor) and power supplied voltage on the AUX- channel. This reversal of polarity on AUX+/- indicates to sink side 1120 that source side 1110 is present. When the sink knows it is connected to the source, it may send a signal such as a hot plug detect (HPD) to source side 1110 to indicate that sink side 1120 is ready to receive data. In other embodiments, the opposite may be true. That is, without connection of the sink, HPD is still HIGH in the sink. As a result, the sequence may be source detects HDP to initiate sending of the AUX signal from source to sink.

Mobility DisplayPort (MyDP) is an extension of the DisplayPort connectivity standard that enables mobile devices to output video and audio to an external screen using the existing format of a microUSB port. MyDP is sometimes referred to as SlimPort. The source/sink detection scenario for MyDP is similar DP for the sink side, but also uses a detection method on the source side of the link. MyDP only uses the AUX+ connection (sometimes referred to as C-wire) on the source side. When the connection is not present, the AUX+ link will float until a cable is plugged in. The cable will indicate MyDP (620 KOhm pulldown+/-1%) or USB (other pulldown resistor existing between 1 MOhm and 0 Ohms, but not 620 KOhm). On the sink side, the detection is the same as DP, discussed above. On the source side, the detection is using the AUX+ only and does not use HPD (as it uses polling from the source to the sink in place of HDP).

DP and MyDP embodiments implemented using CCUs according to embodiments discussed herein cannot use physical couplings to pullup/pulldown the AUX+ and AUX- lines. Thus, when a source and sink are placed within contactless communication range of each other, the polarity of the AUX channels cannot be switched via a physical connection event. Rather, DP and MyDP embodiments use CCUs to emulate and coordinate HPD and the pullup/pulldown. One advantage of using CCUs in DP and MyDP embodiments is that the pull-up/pull-down circuitry associated with conventional DP and MyDP implementations can be eliminated.

Figure 13:
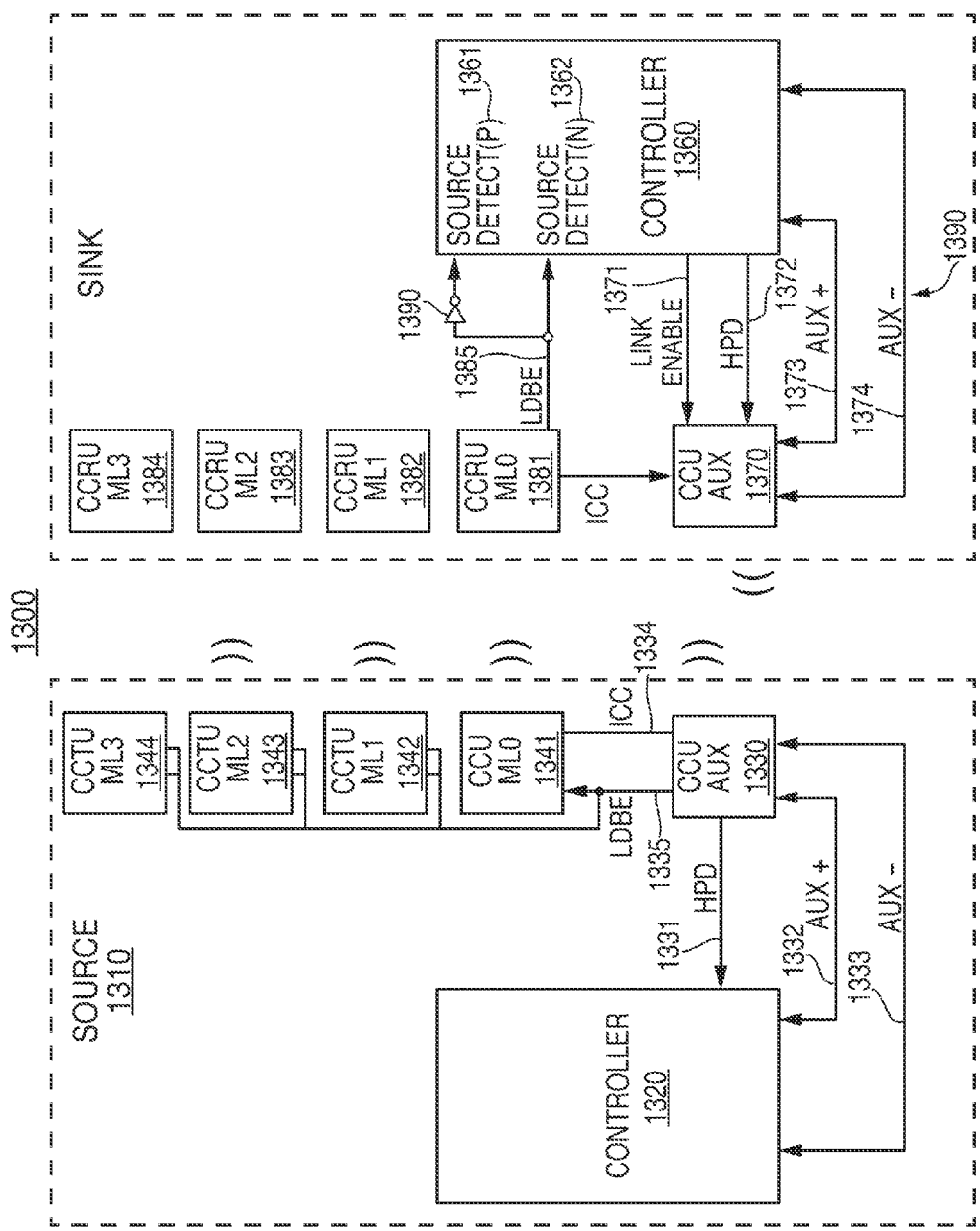
FIG. 13 shows illustrative multi-lane DisplayPort system, according to an embodiment.

FIG. 13 shows illustrative multi-lane DisplayPort system 1300 according to an embodiment. System 1300 can include source device 1310 (demarcated by dashed lines) and sink device 1350 (demarcated by dashed lines). Both source device 1310 and sink device 1350 may be independently powered by their own power sources. Source device 1310 can include controller 1320, auxiliary CCU 1330, and CCTUs 1341-1344. CCU 1330 may be connected to controller 1310 via hot plug detect (HPD) 1331, auxiliary+ (AUX+) 1332, auxiliary- (AUX -) 1333. CCU 1330 may be connected to CCU 1341 via line 1334 (shown as ICC line) and can be connected to each of CCUs 1341-1344 via LDBE line 1335. Sink device 1350 can include controller 1360, auxiliary CCU 1370, and CCRUs 1381-1384. CCU 1370 can be connected to controller 1360 via link enable 1371, HPD 1372, AUX+ 1373, and AUX- 1374. CCU 1370 may also be connected to CCRU 1381 via ICC 1375. LDBE 1385 of CCRU 1381 may be coupled to source detect(n) 1362 of controller 1360. LDBE 1385 may be also be coupled to the input of inverter 1390, which has an output coupled to source detect (p) 1361.

LDBE 1385 and inverter 1390 may operate together to switch the polarity of source detect (p) 1361 and source detect (n) 1362 to emulate the pull-up/pull-down switch that occurs when a physical connection is made between a source and sink. As shown, source detect (n) 1362 is tied directly to LDBE 1385 and source detect (p) 1361 is inversely tied to LDBE 1385 (via inverter 1390). Thus, when LDBE 1385 is LOW (e.g., to signify that sink device 1350 is not contactlessly connected to source device 1310), source detect (p) 1361 is HIGH and source detect (n) 1362 is LOW. The HIGH and LOW association with respective source detect (p) 1361 and source detect (n) 1362 can represent the conditions of AUX+/- when there is no connection between source device 1310 and sink device 1350. When LDBE 1385 goes HIGH (e.g., to signify that sink device 1350 is contactlessly connected to source device 1310), source detect (p) 1361 is LOW and source detect (n) 1362 is HIGH. When source detect (p) 1361 is LOW and source detect (n) 1362 is HIGH, this represents a switch from the unconnected state to a state where there is a connection between source device 1310 and sink device 1350. The polarity switch of source detect (p) and source detect (n) enables use of CCUs in a DisplayPort application without requiring the conventional pull-up and pull-down circuitry required of conventional DisplayPort applications.

The status of HPD 1372 may be controlled by controller 1360. In some embodiments, controller 1360 may place HPD 1372 in a constant HIGH state. In other embodiments, controller 1360 may drive HPD 1372 HIGH when it confirms that data lines (not shown) are active and/or connected to controller 1360.

Figure 14:
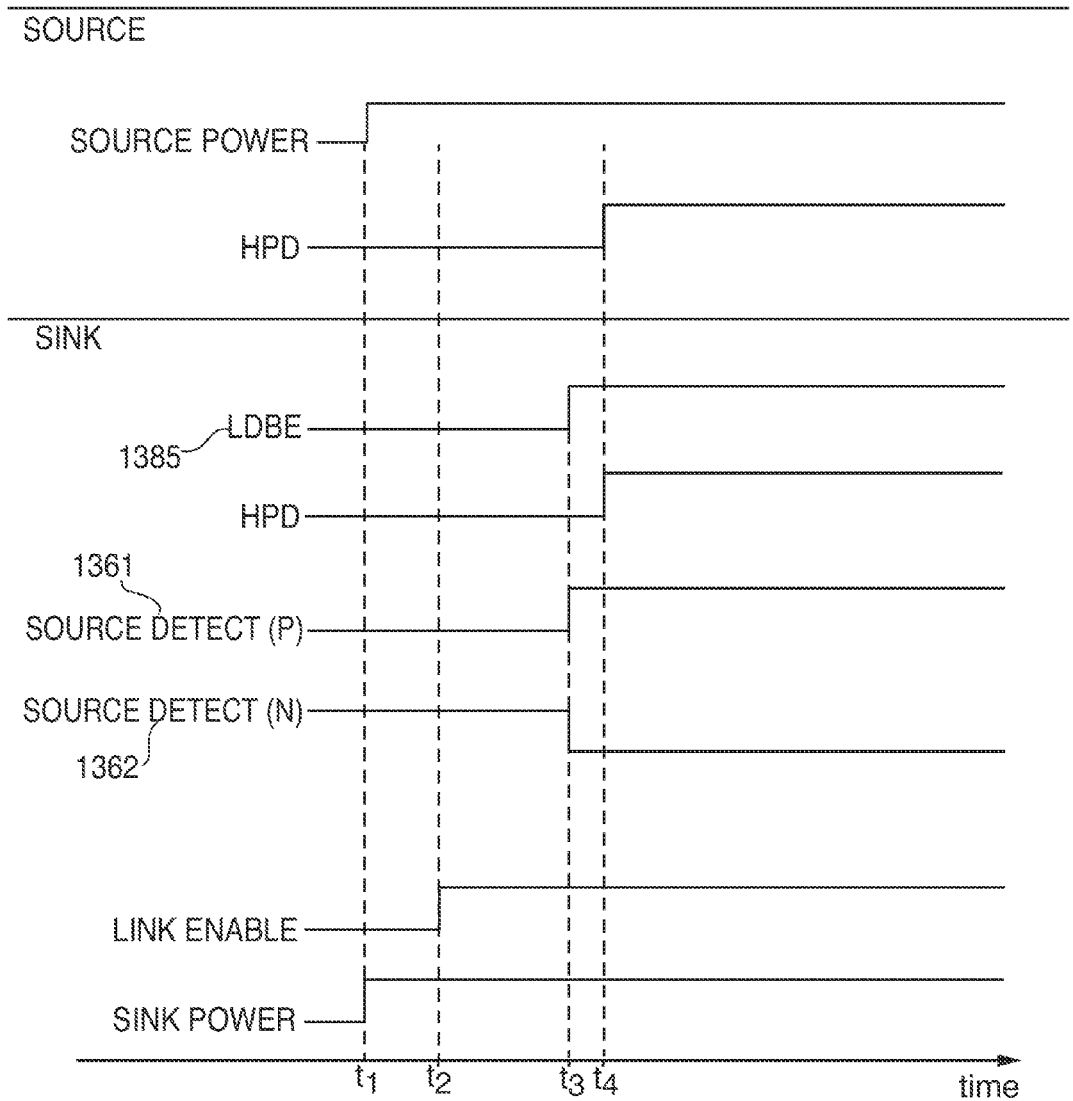
FIG. 14 shows an illustrative timing diagram of different signals involved in power up sequence of DisplayPort system of FIG. 13, according to an embodiment.
Figure 15:
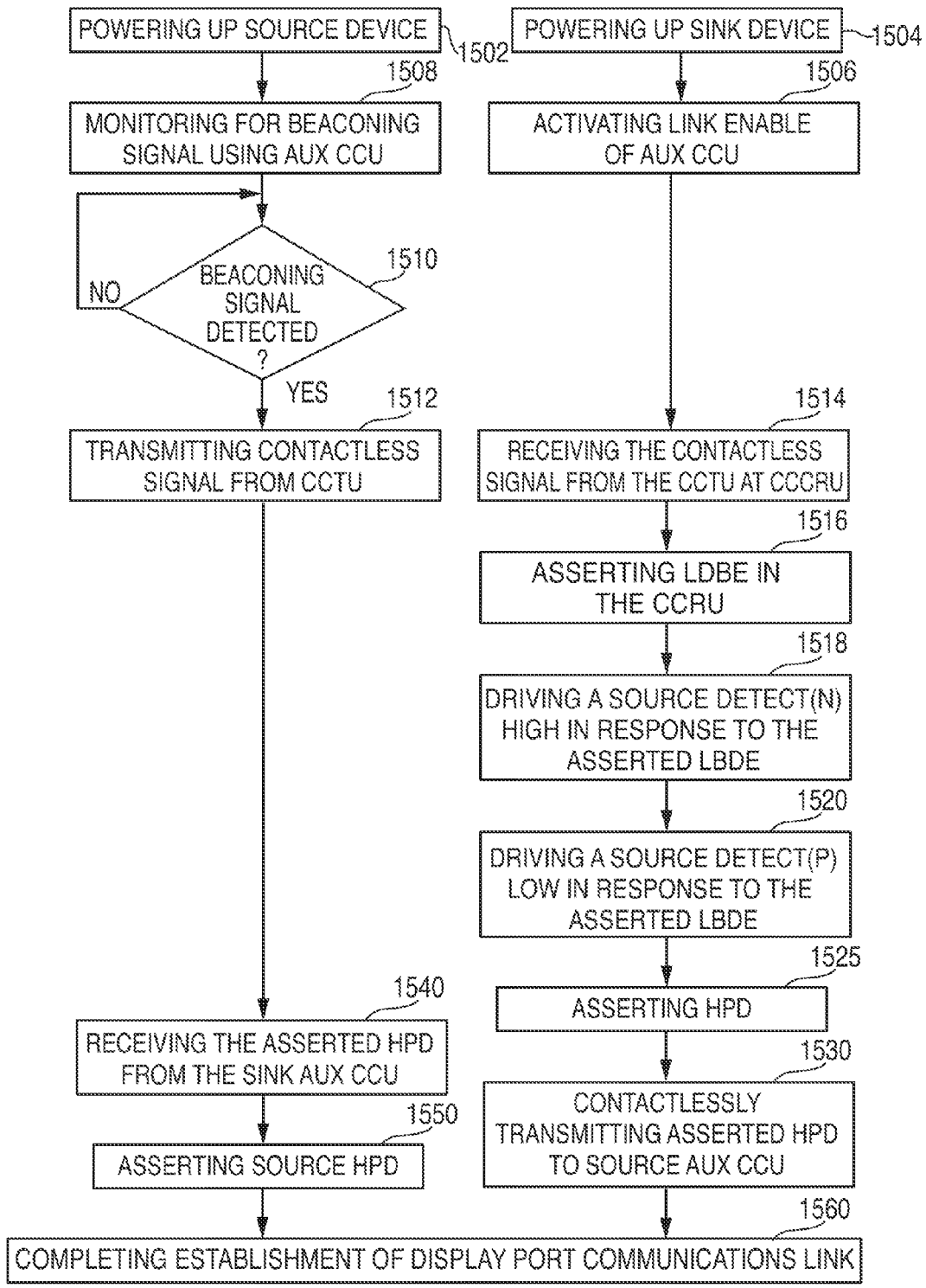
FIG. 15 shows illustrative process for controlling the power up sequence of the DisplayPort system of FIG. 13, according to an embodiment.

FIG. 14 shows an illustrative timing diagram of different signals involved in power up sequence of DisplayPort system 1300, according to an embodiment. FIG. 15 shows illustrative process 1500 for controlling the power up sequence of DisplayPort system 1300, according to an embodiment. FIG. 15 is now discussed in reference to FIGS. 13 and 14. Process 1500 shows the operations performed by source device 1310 (as indicated on the left side of the FIG) and sink device 1350 (as indicated on the right side of the FIG). Some operations may be performed in parallel (or at substantially the same). At step 1502, source device 1310 may be provided with power. This is also shown in FIG. 14, where source power transitions from LOW to HIGH at time, t1. At step 1504, sink device 1350 may be provided with power. This is also shown in FIG. 14 where sink power transitions from LOW to HIGH at time, t1.

At step 1506, the link enable of AUX CCU 1370 may be enabled so that CCU 1370 can start its POC beaconing. In FIG. 14, link enable goes HIGH at time, t2. At step 1508, AUX CCU 1330 may monitor for the beaconing signal being emitted by AUX CCU 1370. At step 1510, a determination is made whether a beaconing signal is detected. If no signal is detected, process 1500 may revert to step 1508. If a signal is detected, process 1500 may proceed to step 1512, where CCTU 1341 transmits a contactless signal to CCRU 1381. At step 1514, the contactless signal is received from CCTU 1341 at CCRU 1381. After receipt of the contactless signal, CCRU 1381 can assert LDBE 1385. In FIG. 14, LDBE 1385 transitions to HIGH at time, t3.

The transition of LDBE 1385 to HIGH also causes source detect (n) 1362 to go HIGH (as indicated by step 1518), and also causes source detect (p) 1361 to go LOW (as indicated by step 1520). HPD 1372 can be asserted at anytime, but is shown here to be asserted at time, t4, (as indicated by step 1525) and AUX CCU 1370 contactlessly transmits the asserted HPD signal to AUX CCU 1330 (as shown in step 1530). AUX CCU 1330 receives the asserted HPD signal via the contactless communication from AUX CCU 1370 (at step 1540) and asserts the source HPD at step 1550. Assertion of the source and sink HPD can both occur at time, t4. In some embodiments, activation of HPD on the source side may be delayed with respect to the sink side activation of HPD. After both the source controller 1320 and sink controller 1360 have confirmed that the DisplayPort link is ready (by assertion of LDBE 1385 and HPD 1331), both source 1310 and sink 1350 can complete establishment of the DP communications link, at step 1560.

It should be understood that the steps shown in FIG. 15 are merely illustrative and that additional steps may be added, rearranged, or that steps may be omitted. For example, the assertion of HPD 1372 may be occurred prior to the assertion of LBDE 1385.

Figure 16:
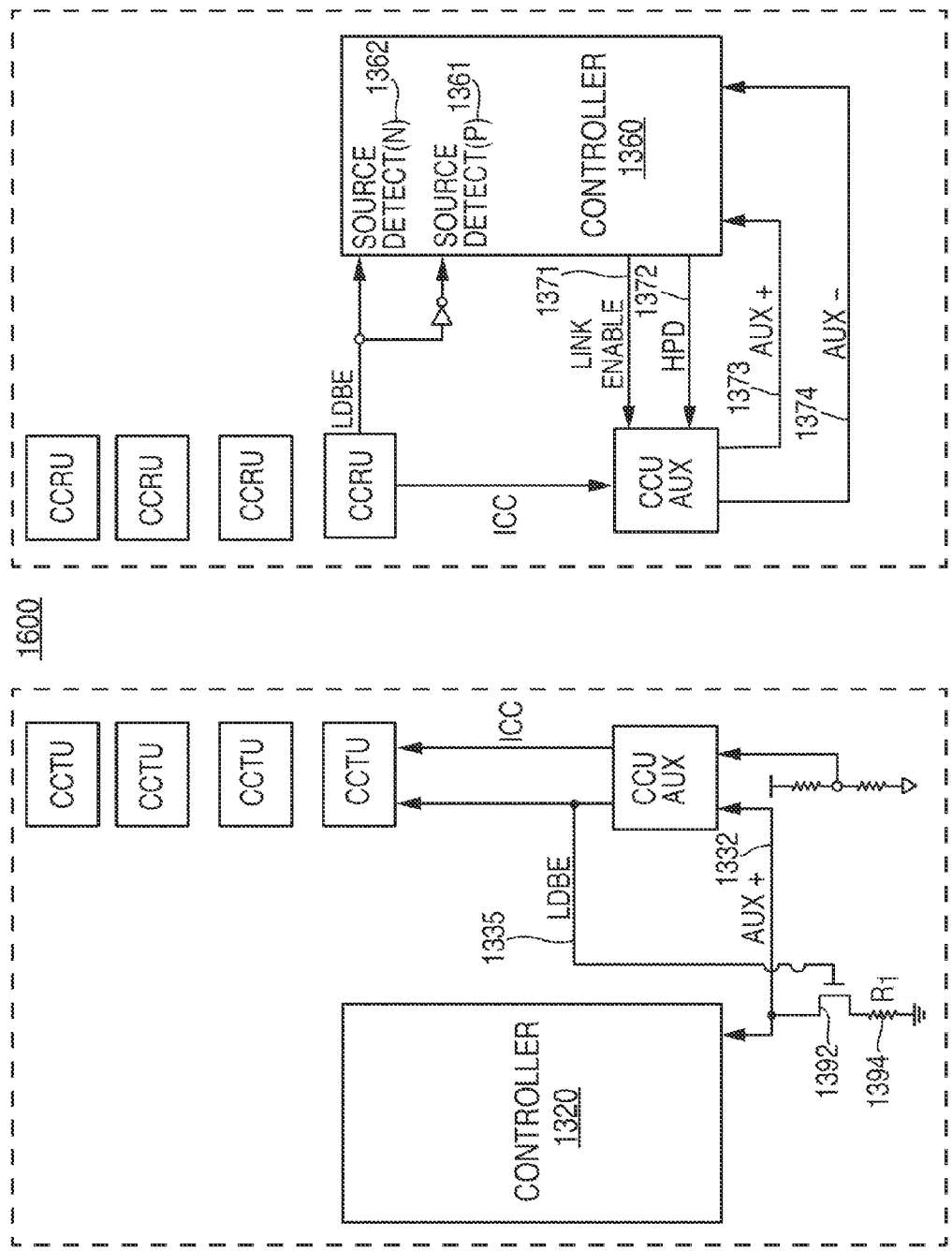
FIG. 16 shows illustrative multi-lane Mobility DisplayPort system, according to an embodiment.

FIG. 16 shows illustrative multi-lane MyDP system 1600 according to an embodiment. System 1600 is similar in many respect to system 1300 of FIG. 13, with the exception of the addition of switch 1392 and resistor 1394, and the deletions of HPD 1331 and AUX− 1333. Switch 1392 is coupled to AUX+ 1332, resistor 1394, and LDBE 1335. LDBE 1335 may determine whether switch 1332 is ON or OFF. When switch 1332 is ON, AUX+ 1332 is pulled down to ground via resistor 1394. In some embodiments, resistor 1394 may have a resistance of about 620 KOhms. If desired, resistor 1394 may have different resistance values to indicate different protocols. For example, a pull down with a 100 KOhm resistor may indicate that the link is USB and a pulldown of 620 KOhm resistor may indicate that the link is DP. It should be appreciated that different resistors of different resistance values may be used to signify different link protocols (e.g., such as USB). During the MyDP link establishment process, when LDBE 1335 is asserted to enable CCTU 1334, it also activates switch 1392. Activation of switch 1392 pulls down AUX+ 1332 to indicate to controller 1320 that a MyDP connection is ready. Thus, there is no need for HPD 1331. Establishment of the MyDP connection on the sink side can operate the same way as it does for establishing a DisplayPort connection.

Figure 17:
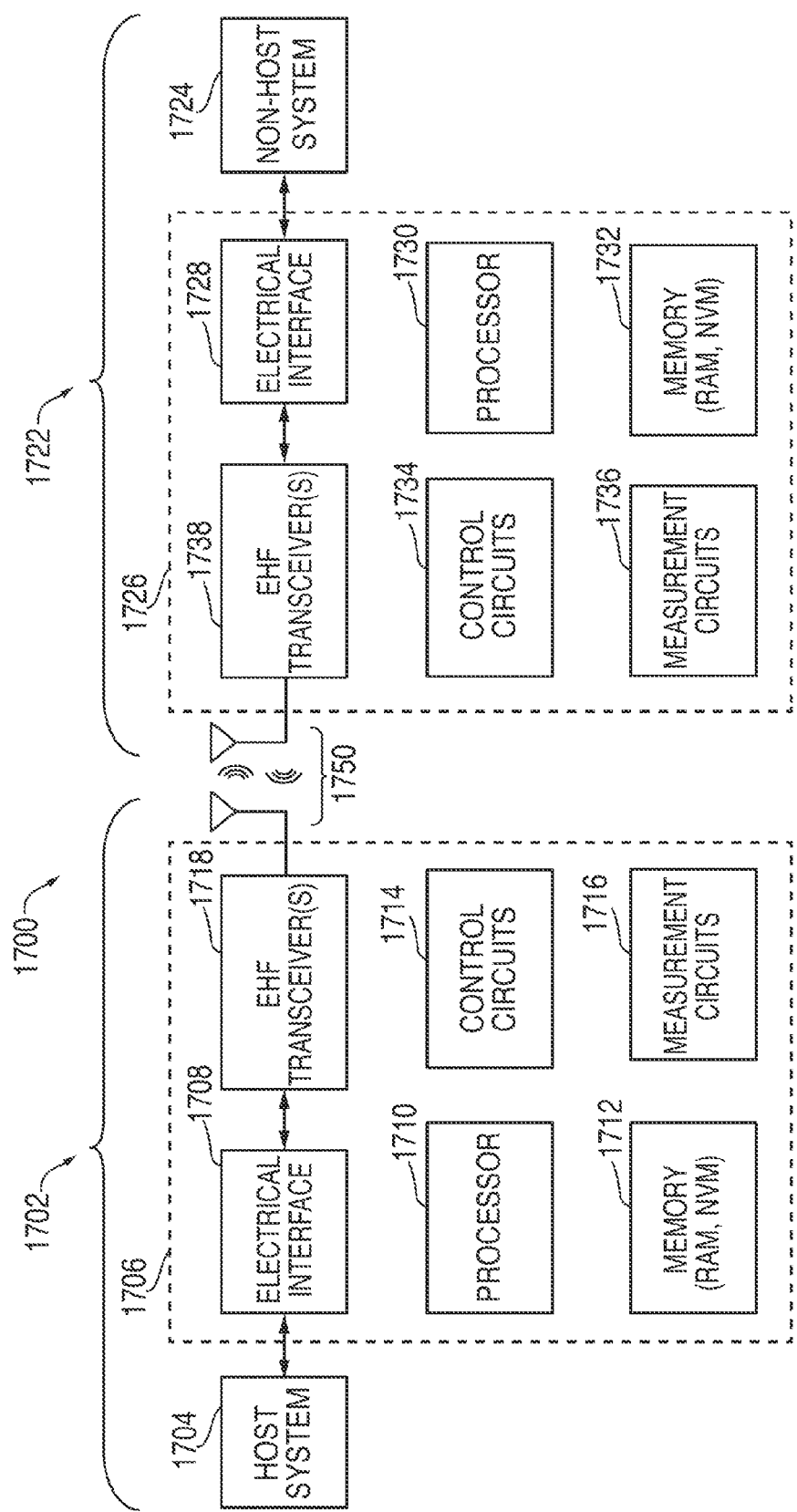
FIG. 17 illustrates a communications system, according to an embodiment.

FIG. 17 illustrates a communications system 1700 wherein two electronic devices 1702 and 1722 may communicate with one another over a contactless communications link 1750. Data may be transferred in at least one direction, from first device 1702 which may be regarded as a "source" for sending the data to be transferred, to second device 1722, which may be regarded as a "destination" for receiving the transferred data. With reference to FIG. 17, the transfer of data from first device 1702 to second device 1722 may be described. However, it should be understood that data may alternatively or additionally be transferred from second device 1722 (acting as a "source" for sending the data) to first device 1702 (acting as a "destination" for receiving the data), and that often information may be exchanged in both directions between devices 1702 and 1722 during a given communications session.

For illustrative clarity, devices 1702 and 1722 will be described as "mirror images" of one another, but it should be understood that the two devices 1702 and 1722 may be different than each other. For example, one of the devices may be a laptop computer, the other device may be a mobile phone. Some examples of electronic devices which may benefit from the techniques disclosed herein may include cell phones (or handsets, or smart phones), computers, docks (docking stations), laptops, tablets, or comparable electronic device, to name but a few.

First electronic device 1702 may include a host system 1704 and a contactless communication unit (which may be referred to as "smart" contactless connector, a communication subsystem, "smart connector", "contactless connector", or simply "connector") 1706. The unit 1706 associated with the electronic device may be generally capable of performing at least one of establishing and managing operation of contactless link 1750 with unit 1726, of second device 1722, monitoring and modifying data passing through unit 1706 onto link 1750, and interfacing with and providing application support for host system 1704. These functions of unit 1706, with regard to interacting with link 1750, the data and host system 1704 may be described and elaborated upon and discussed in greater detail hereinbelow (or elsewhere in this disclosure).

Unit 1706 associated with first device 1702 may include some or all of the following elements: electrical interface 1708, processor 1710 and associated memory 1712, control circuits 1714, measurement circuits 1716, and one or more transceivers 1718. The operation of these various elements (1710-1718) may be described and elaborated upon and discussed in greater detail herein below (or elsewhere in this disclosure).

Second electronic device 1722 may include non-host system 1724 and a contactless communication unit (which may be referred to as "smart" contactless connector, or "communication unit", or "smart connector", or "contactless connector", or simply "connector") 1726. The unit 1726 associated with the electronic device may be generally capable of establishing and managing operation of contactless link 1750 with unit 1706, of first device 1702, monitoring and modifying data passing though the unit 1726 onto link 1750, and interfacing with and providing application support for host system 1724. These functions of unit 1726, with regard to interacting with link 1750, the data and the host system 1724 may be described and elaborated upon and discussed in greater detail hereinbelow (or elsewhere in this disclosure).

Unit 1726 associated with second device 1722 may include some or all of the following elements: an electrical interface 1728, processor 1730 and associated memory 1732, control circuits 1734, measurement circuits 1736, and one or more transceivers 1738. The operation of these various elements (1730-1738) may be described and elaborated upon and discussed in greater detail hereinbelow (or elsewhere in this disclosure).

Units 1706 and 1726 may operate without intervention from the host processors (in the host systems 1704 and 1724, respectively), and may take control of the host system 1704 and 1724, respectively, or portions thereof. Units 1706 and 1726 may open/activate applications, return status/power levels, connection parameters, data types, information on devices/systems that are connected, content information, amount and type of data being transferred, including device configuration based on connection type, link management, quota information, channel control, and the like.

The dashed-line rectangles shown (in the figure) around the units 1706 and 1726 may simply represent "partitioning" of functions, separating (distinguishing) units 1706 and 1726 from host system 1704 and 1724, respectively. The antennae shown (symbolically) outside of the dashed-line rectangles may be considered to be within the functional blocks of units 1706 and 1726, but may be disposed either internal or external to a communications chip constituting the contactless connector. The dashed-line rectangles shown (in the figure) around units 1706 and 1726 may also represent non-conducting barriers (housings, enclosures, or the like, not shown), such as of plastic or acrylic enclosing units 1706 and 1726 or entire devices 1702 and 1722, respectively, as described hereinabove.

Electrical interfaces 1708 and 1728 may include communications port(s)/channel(s) to communicate with host systems 1704 and 1724, respectively. Host system 1704 and non-host system 1724 may have their own processors and associated circuitry (not shown).

Processors 1710 and 1730 may be embedded microprocessors, microcontrollers, or state machines. The processors may run management OS for the connection, and may have built-in authentication/encryption engines. Processors 1710 and 1730, either alone or in combination with other elements presented herein, may be operative to manage the communications link 1750, to monitor data passing through the units and over the communications link, or to provide application support for the host system, or to execute one or more state machines, or variations thereof as may become evident from the several functional descriptions set forth herein. In a broader sense, units 1706 and 1726 are capable of performing one of more of (at least one of) the various functions described herein.

Memory 1712 and 1732 may be RAM (random access memory), NVRAM (non-volatile RAM), or the like, and may include registers containing configuration, status, permissions, content permissions, keys for authentication/encryption, and the like.

Control circuits 1714 and 1734 may include any suitable circuitry capable of monitoring the state of the link and/or actively appending to or changing data concurrently ("on-the-fly") as it goes through unit 1706 or 1726, respectively.

Measurement circuits 1716 and 1736 may include any suitable circuitry capable of observing (monitoring) the connection state/status, the connection type and the data being transmitted. Sensors (not shown) may be included to monitor signal strength, ambient environmental conditions, and the like. Signal-to-noise ratio can be used as an indicator of signal quality. In some embodiments, sensors may be used to determine coupling or docking events.

Transceivers 1718 and 1738 may include any transceivers (and associated transducers or antennas) suitable for converting between electrical signals (for the host system) and electromagnetic signals (for the contactless communications link), such as have been described hereinabove. Transceivers 1718 and 1738 may each be a half-duplex transceiver or a full-duplex transceiver, either of which can asynchronously convert a baseband signal into a modulated EHF carrier which is radiated from an internal or external antenna (shown schematically only), or can receive and demodulate the carrier and reproduce the original baseband signal. The EHF carrier may penetrate a wide variety of commonly-used non-conductive materials (glass, plastic, etc.).

It should be understood that if only one-way communication is required, such as from first device 1702 to second device 1722, transceiver 1718 could be replaced by transmitters(s) and transceiver 1738 could be replaced by receiver(s).

Transmit power and receive sensitivity for transceivers 1718 and 1738 may be controlled to minimize electromagnetic interference effects and simplify FCC certification, if required.

Transceivers 1718 and 1738 may be implemented as IC chips comprising a transmitter, a receiver and related components. Transceiver chip(s) may be packaged in a conventional manner, such as in ball grid array (BGA) format. The antenna may be integrated into the package, external to the package, or incorporated onto the chip itself. An exemplary unit 1706, 1726 may include one, two, or more transceiver chips. Some features or characteristics of the transceivers 1718 and 1738 may include low latency signal path, multi-gigabit data rates, link detection and link training. The signals transmitted by transceivers 1718 and 1738 may be modulated in any suitable manner to convey the data being transferred from one device to the other device, some non-limiting examples of which are presented herein. Modulation may be OOK (on/off keying), ASK, PSK, QPSK, QAM or other similar simple modulation techniques. Signals may be encoded and optionally packetized and transmitted by one transceiver (such as 1718), and received and optionally unpacketized and decoded by another transceiver (such as 1738). Out-of-band (OOB) signaling or other suitable techniques may be used to convey information other than or related to the data being transferred between the two devices.

Transceivers 1718 and 1738, or individual transmitters and receivers, which may be implemented as chips, may be factory-serialized, so that the chips and their transmissions may be 'tagged' (fingerprinted), which may enable a later forensic analysis to be performed for digital rights management. For example, protected (premium) content could be freely transferred from one device to another, but the transaction could be traced to the specific devices involved, so that the participants in the transaction can be held accountable (such as, billed). Premium protected content may be modified, data appended thereto, and can be logged with chip ID, user ID, or by other means.

Communications link 1750 may be a "contactless" link, and the first and second units 1706 and 1726 may be "contactless" connectors, as described herein. Differences between units 1706 and 1726 disclosed herein and conventional mechanical connectors may be immediately apparent, and may be described herein. The units may be considered to be communication subsystems of a host device. In this regard, differences between the contactless connectors 1706 and 1726 disclosed herein and controllers such as Ethernet (Standard) controllers may not be immediately apparent in that both may handle data flow between a host system and a communications link. However, a distinction between the contactless connectors disclosed herein and exemplary Standards controllers is that the contactless connectors disclosed herein both set up the contactless communications link and transfer data from a host system directly onto the contactless communications link, without the intermediary (for example) of mechanical (electrical, not RF) connectors and a cable. Further distinctions may be made in the way that the contactless connectors disclosed herein are capable of operating independently and transparently from the host system, without requiring host awareness or interaction.

Data transfer between electronic devices 1702 and 1722 may be implemented over a "contactless" RF electromagnetic communications link (interface) 1750, which is handled substantially entirely by the units 1706 and 1726 of first and second devices 1702 and 1722, respectively. Signals flow between the devices 1702 and 1722 electromagnetically over a non-electrical (dielectric) medium such as an air gap, waveguide, plastics (polyethylene, thermoplastic polymers, polyvinylidene difluoride, fluoropolymers, ABS, and other plastics), including combinations of these materials. The EHF signal can pass through other dielectric materials such as cardboard, and/or through a series of different dielectric materials and/or waveguides. Alternatively, the communications link may be a slot antenna in a conductive medium directing the contactless connectivity in a desired direction. A device (at least the contactless connector) may be substantially enclosed by a conductive medium other than at a location where it is desired to emit and receive EHF radiation from a partner device (at least the contactless connector thereof) which may also be similarly substantially enclosed by a conductive medium.

Due to the high data rate enabled by the EHF contactless communication, large data files, such as movies, audio, device images, operating systems, and the like may be transferred in very short periods of time in contrast with existing technologies such as near field communication (NFC). As an example, a 1 Gigabyte data file may be transferred in as little as 2 seconds. The electromagnetic communication may typically be over an air gap may be limited to a short range, such as 0-5 cm. A dielectric medium, such as a dielectric coupler, may be used to extend the range of the contactless link between the devices 1702 and 1722 to several centimeters (cm), meters, or more.

It should be understood that in this, and any other embodiments of contactless links discussed herein, an overall communications system may be implemented as a combination of contactless and physical links. Furthermore, some of the techniques described herein may be applied to transferring data over a physical link. In such a link the transceiver can contactlessly transmit data to a cable that serves as a physical conduit for the data.

One or both of devices 1702 and 1722 may have two or more transceivers. Having two or more transceivers may support a feedback loop, latency, changes, full duplex operation, and simultaneously establishing a second communications link (such as for communicating with the host system).

An exemplary "data flow" may proceed as follows. Data originating from host system 1704 (or data originating at unit 1706) may be provided by unit 1706, via its transceiver 1718, onto the communications link 1750. The data passes through (or over) communications link 1750. Data received from the communications link 1750 by the transceiver 1738 of unit 1726 may be provided to non-host system 1724 (or may remain in unit 1726). Data may flow in the reverse direction, from non-host system 1724 via unit 1726 (or originate at unit 1726) onto the contactless link 1750 to unit 1706 which may pass the data to the host system 1704.

Figure 18:
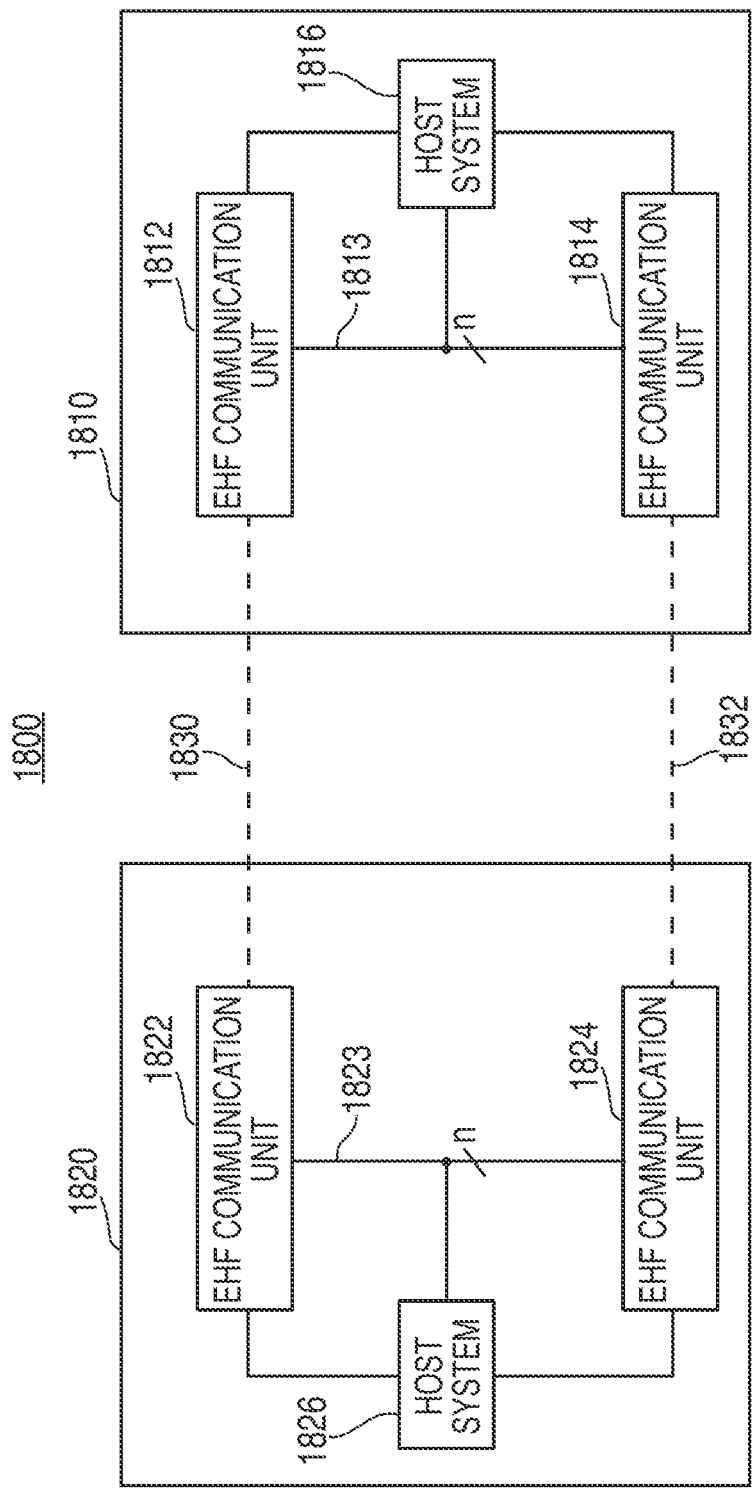
FIG. 18 illustrates a communications system in which two electronic devices communicate with one another over two or more contactless communications links, according to an embodiment.

FIG. 18 illustrates a communications system 1800 wherein two electronic devices 1810 and 1820 may communicate with one another over two or more contactless communications links, according to an embodiment. System 1800 may be similar to system 1700 in many respects, but for illustrative and simplified discussion purposes, shows that each device includes two EHF communication units. Moreover, any EHF communication unit in system 1800 may be the same or substantially the same as any EHF communication unit in system 1700. As such, a more simplified representation of units 1706 and 1726 are shown in FIG. 18. If desired, each device can include more than two EHF communication units. First device 1810 may include EHF communication unit 1812, EHF communication unit 1814, and host system 1816. One or more wired paths 1813 may directly connect EHF communication units 1812 and 1814 together. Host system 1816 may communicate with EHF communication units 1812 and 1814. In some embodiments, EHF communication units 1812 and 1814 may communicate with each other through host system 1816. In other embodiments, host system 1816 may be able to drive a signal on at least one of wired paths 1813. Similarly, second device 1820 may include EHF communication unit 1822, EHF communication unit 1824, and host system 1826. One or more wired paths 1823 may directly connect EHF communication units 1822 and 1824 together. Host system 1826 may communicate with EHF communication units 1822 and 1824. In some embodiments, EHF communication units 1822 and 1824 may communicate with each other through host system 1826. In other embodiments, host system 1826 may be able to drive a signal on at least one of wired paths 1823. Host systems 1816 and 1826 may be similar to host systems 1704 and 1724, both of which include circuitry specific to their respective devices and thereby enable devices 1810 and 1820 to operate for their intended functionality.

In some embodiments, each of EHF communication units 1812, 1814, 1822, and 1824 can be the same as EHF communication unit 1706 or 1726, discussed above. As such, EHF communication units 1812, 1814, 1822, and 1824 include transceivers capable of being configured to transmit and/or receive EHF signals. For example, in one approach, units 1812 and 1824 can be configured to receive EHF signals and units 1814 and 1822 can be configured to transmit EHF signals. Thus, in this approach, a contactless communications link 1830 may exist between EHF communication units 1812 and 1822, and contactless communications link 1832 may exist between EHF communication units 1814 and 1824. As shown, units 1812 and 1822 may work together as a coupled pair of units that communicate via link 1830, and units 1814 and 1824 may work together as another coupled pair of units that communicate via link 1832. If one or more additional coupled pairs of units were to be included in system 1800, then additional communications links would also exist.

Embodiments discussed herein refer to systems, methods, and circuits for establishing the contactless communications links among coupled pairs of EHF communication units. In order for devices 1810 and 1820 to communicate with each other using one or more contactless links, the EHF units responsible for establishing those links may have to progress through a series of steps before data can be transferred between the devices. These steps may be controlled by one or more state machines that are being implemented in each contactless communication unit. Collectively, regardless of whether one or more state machines are used to establish a link, the state machine(s) may be referred to herein as a POC state machine. Each contactless communication unit may implement its own POC state machine in order to establish a link with a counterpart unit.

Each POC state machine may collaborate to progressively transition their respective communication units through a plurality of states before enabling one or more contactless communications links. The collaboration may be necessary because the mechanism and process of establishing the contactless communications links, and enabling data transfer from a host system directly onto the contactless communications link, is performed without the intermediary (for example) of mechanical (electrical, not RF) connectors and a cable. As such, because there is no electrical connection (except perhaps for delivering power) between, for example, units 1812 and 1822, the POC state machines may rely on a "wake up" loop to communicate with each other before the contactless communications link is established. In some embodiments, the POC state machine may collaborate with the state machine of the host system. For example, an entry into power up or power down state may be directed by the host system.

The wake up loop can be an inter-unit communications channel that includes a combination of wired and contactless paths. The wake up loop can also include as many contactless units as necessary to provide the communications channel needed to establish one or more communications links. In some embodiments, only two units can be used. A wake up loop using only two units may require selective gating of each unit's transceiver so that a loop can exist over a single contactless path. In other embodiments, such as that shown in FIG. 18, at least four units can be used to define a wake up loop. As shown, the wake up loop in system 1800 can include unit 1812, wired path 1813, unit 1814, contactless path 1832, unit 1824, wired path 1823, unit 1822, and contactless path 1830. Thus, in this arrangement, although units 1812 and 1822 may be operative to establish link 1830, they may depend on the wake up loop to communicate with each other to establish link 1830. For example, assume that unit 1822 operates as a transmitter unit and unit 1812 operates as an receiver unit. Since unit 1822 is a transmitter unit, it may be able to transmit signals directly to unit 1812 via link 1830. However, because unit 1812 is operating as a receiver unit, it is not able to transmit signals to unit 1822 via the same link 1830. Instead, unit 1812 may communicate with unit 1822 indirectly using a combination of wired and contactless paths in the wake up loop. In this example, unit 1812 may communicate with unit 1822 via wired path 1813, unit 1814, link 1832, unit 1824, and wired path 1823. Thus, in order for a coupled pair to communicate signals back and forth among each other, the coupled pair may leverage the wake up loop (e.g., the wired paths connected to another coupled pair, and the contactless path existing between that other coupled pair).

The wake up loop may define upstream and downstream relationships among the contactless communication units. The direction of the wake up loop may be based on the transmitter/receiver designations for each of the communication units. For example, in system 1800, assuming units 1814 and 1822 are transmitters, and units 1812 and 1824 are receivers, the wake up loop may progress in a clockwise direction. In a clockwise oriented wake up loop, unit 1814 may be immediately downstream from unit 1812, and unit 1822 may be immediately upstream from unit 1812. As another example, assuming units 1814 and 1822 are receivers, and units 1812 and 1824 are transmitters, the wake up loop may progress in a counter-clockwise direction.

The collaborative nature of the POC state machine may be realized in that a state change transition of a first POC state machine may propagate around the wake up loop to cause a new state change in each downstream POC state machine. Each state change transition may prompt any given communications unit to notify its immediately downstream unit of its state change, thereby prompting the POC state machine of that downstream unit to transition to a new state. Thus, in order for the first POC state machine to transition to a new state, it may have to wait for state changes to propagate all the way around the loop, back to the first POC state machine. Thus, the first POC state machine may have to wait for the state machine of the immediate upstream unit to transition to a new state, and receive notification of that transition, before the first POC state machine can transition to a new state. This propagation of new state change transitions may continue to loop around the wake up loop until one or more links are enabled to transmit data between devices. In order to begin the wake up loop, a host system may assert one or more signals to one or more EHF communications units. The POC state machines of the targeted EHF communication units may transition to a new state or may begin beaconing or listening as described below in response to the signals from the host system.

As discussed above, each communication unit executes its own POC state machine. That POC state machine may include several different states (discussed below). In order for the POC state machine to cause state change transitions from one state to another, one or more conditions may have to be met. Some of these conditions may be provided as notifications from sources external to the communication unit or can be generated internally within the communications unit. Externally sourced notifications can be received via the transceiver or pins that make up part of an integrated circuit package of the unit. In order to provide a basis for discussing where such notifications can be received and generated, reference is now made to FIG. 19.

Figure 19:
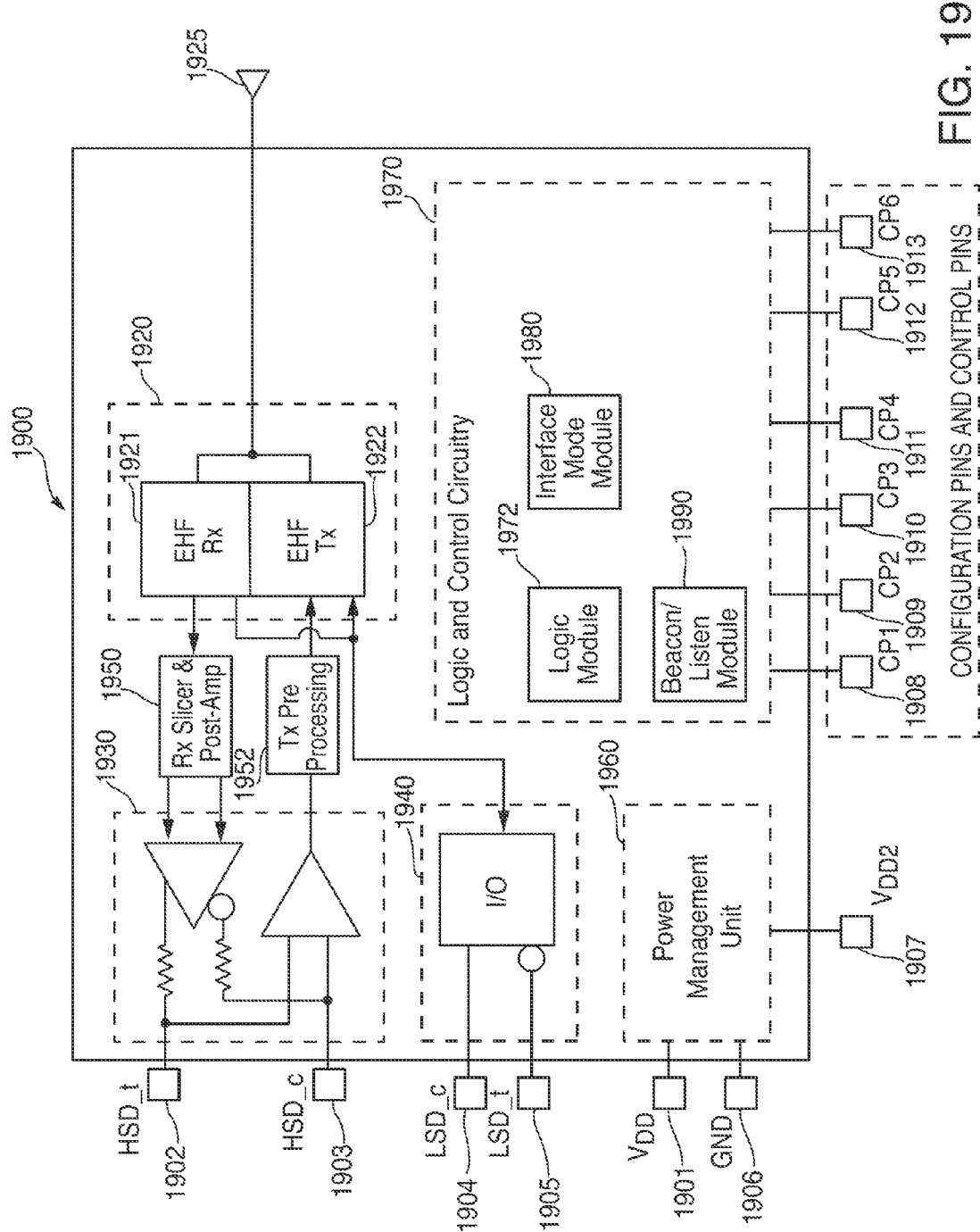
FIG. 19 is an illustrative schematic diagram of an EHF communication unit, according to an embodiment.

FIG. 19 shows an illustrative block diagram of EHF contactless communication unit 1900 according to an embodiment. Unit 1900 may be, for example, an IC including several pins. As shown, unit 1900 may include pins 1901-1913, EHF transceiver 1920, antenna 1925, high-speed circuitry 1930, low-speed circuitry 1940, receiver slicer and post-amp circuitry 1950, transmitter pre-processing circuitry 1952, power management circuitry 1960, and logic and control circuitry 1970. Logic and control circuitry 1970 may include several modules, which may represent hardware and/or software components for operating specific functions of unit 1900. For example, logic and control circuitry may include logic module 1972, interface mode module 1980, and beacon/listen module 1990. Vdd pin 1901 may be coupled to an external source for powering unit 1900. Vdd2 pin 1907 may be an optional pin as shown, or it may be internally bonded to Vdd pin 1901. Ground pin 1906 may be coupled to a ground source (not shown).

High-speed circuitry 1930, low-speed circuitry 1940, receiver slicer and post-amp circuitry 1950, and transceiver pre-processing 1952 may be referred to collectively herein as baseband circuitry. Power management circuitry 1960, logic and control circuitry 1970, logic module 1972, interface module 1980, and beacon/listen module 1990 may be referred to herein as control circuitry.

High-speed differential (HSD) pins 1902 and 1903 may function as input and/or output pins for high-speed circuitry 1930. High-speed circuitry 1930 may be operative to process signals according to various protocols, including, for example, USB, SATA, PCIe, and DP. Low-speed differential (LSD) pins 1904 and 1905 may function as input and/or output pins for low-speed circuitry 1940. Low-speed circuitry 1940 may be operative to process signals according to various protocols, including for example USB high-speed/full-speed, DP Auxiliary, I2S, GPIO, I2C, and other low speed signaling schemes. In some embodiments, low-speed circuitry 1940 may process protocols that operate at speeds that are slower relative to protocols processed by high-speed circuitry 1940. In some embodiments, high and low speed circuitry 1930 and 1940 may provide baseband functionality.

Transceiver 1920 may be coupled to antenna 1925, high-speed circuitry 1930, and low-speed circuitry 1940. Transceiver 1920 may include an EHF receiver 1921 and an EHF transmitter 1922. Unit 1900 may be designated to operate as either a transmitter unit (in which case EHF transmitter 1922 is selected for operation) or a receiver unit (in which case EHF receiver 1921 is selected for operation). EHF receiver unit 1921 may be coupled to high-speed circuitry 1930 via receiver slicer and post-amp circuitry 1950. Receiver slicer and post-amp circuitry 1950 may assist high-speed circuitry 1930 in processing high-speed protocols. The output of EHF receiver 1921 or receiver slicer and post-amp circuitry 1950 may be coupled to circuitry 1940. Circuitry 1940 may operate as a bidirectional data transfer block either in half-duplex mode or full-duplex mode acting as buffer between the data being transferred between electrical interface 1904/1905 and EHF transceiver 1920. EHF transmitter 1922 may be coupled to high-speed circuitry 1930 and low-speed circuitry 1940.

Logic and control circuitry 1970 may be operative to control operation of unit 1900 according to various embodiments. In some embodiments, logic module 1972 may operate a POC state machine that manages the establishment of a contactless link with another unit. Logic and control circuitry 1970 may communicate with transceiver 1920, high-speed circuitry 1930, low-speed circuitry 1940, and receiver slicer and post amp circuitry 1950. Logic and control circuitry 1970 can use interface module 1980 to operate unit 1900 in a serial interface control mode, such as when using the serial peripheral interface protocol (SPI). The serial interface control mode may be used to perform various diagnostic tests, such as a laboratory and automatic test equipment (ATE) test, and to perform advanced control and manufacturing trim. When unit 1900 is not operating in the serial interface control mode, it may operate in a pin-strapped control mode. In this mode, the operating state of unit 1900 can be controlled by static settings of one or more of pins 1901-1913, and particularly with respect to settings of pins 1908-1913. Logic and control circuitry 1970 may be coupled to pins 1908-1913, and may be configured to operate unit 1900 based on signals provided on one or more of pins 1908-1913. Pins 1908-1913 may be referred to herein collectively as configuration and control pins, and have pin designations CP1-CP6. Some of the pins may act as status or indicator pins, and some may serve as input pins, output pins, or both input and output pins.

The configuration and control pins may indicate which data transport mode should be used for transporting data across a contactless communication link established using unit 1900. In particular, CP2 pin 1909 may be a first data transport selection pin, and CP3 pin 1910 may be a second data transport selection pin. Pins 1909 and 1910 may be set to a logic HIGH, logic LOW, or left to FLOAT. CP1 pin 1908 may function as another data transport selection pin or as an identification pin. CP1 pin 1908 may be driven to one of HIGH, LOW, and FLOAT with a high/low/impedance driver. When CP1 pin 1908 is left to FLOAT, the impedance on the pin may be used to identify which data transport should be used.

CP4 pin 1911 may be set to specify whether unit 1900 is to function in a transmitter mode, a receiver mode, or a control mode, which would utilize interface circuitry 1980. CP5 pin 1912 may be used for inter unit communications. For example, unit 1900 may be able to communicate with another unit (not shown) via CP5 pin 1912. Referring briefly to FIG. 18, wired path 1813 may be coupled to respective CP5 pins on both units 1812 and 1814. This inter unit communication may be used to establish wired portions of a wake up loop among a set of contactless units. CP6 pin 1913 can be used as part of a beacon/listen state machine, which may be controlled by beacon/listen module 1990, and which also may be a subset of the POC state machine. For example, when CP6 pin 1913 is driven HIGH, communication unit 1900 may be turned ON and begins operating according to the beacon/listen state machine.

Beacon/Listen module 1990 may include circuitry for operating a beaconing/listening state machine. Depending on whether unit 1900 is configured to operate as a transmitter or a receiver dictates whether the beacon/listen state machine operates as a beacon state machine or a listen state machine. The beacon state machine may be implemented when unit 1900 is configured for operation as a transmitter and the listen state machine may be implemented when unit 1900 is configured for operation as a receiver. Beacon/Listen module 1990 may use relatively low power consuming circuitry when power is applied to Vdd pin 1901. Its power consumption may be relatively low compared to the power requirements of logic module 1972. As will be explained in more detail below, unit 1900 may initially cycle through the beaconing/listening state machine portion of the POC state machine to conserve power, and then operate according to a relatively higher power consuming portion of the POC state machine.

Power management circuitry 1960 may be operative to regulate power received via pin 1901 and provide regulated power at one or more different power levels, including appropriate voltage levels, to components within unit 1900. For example, power management circuitry 1960 may provide power to beacon/listen circuitry 1990 when unit 1900 is operating according to the beaconing/listening state machine.

Figure 20:
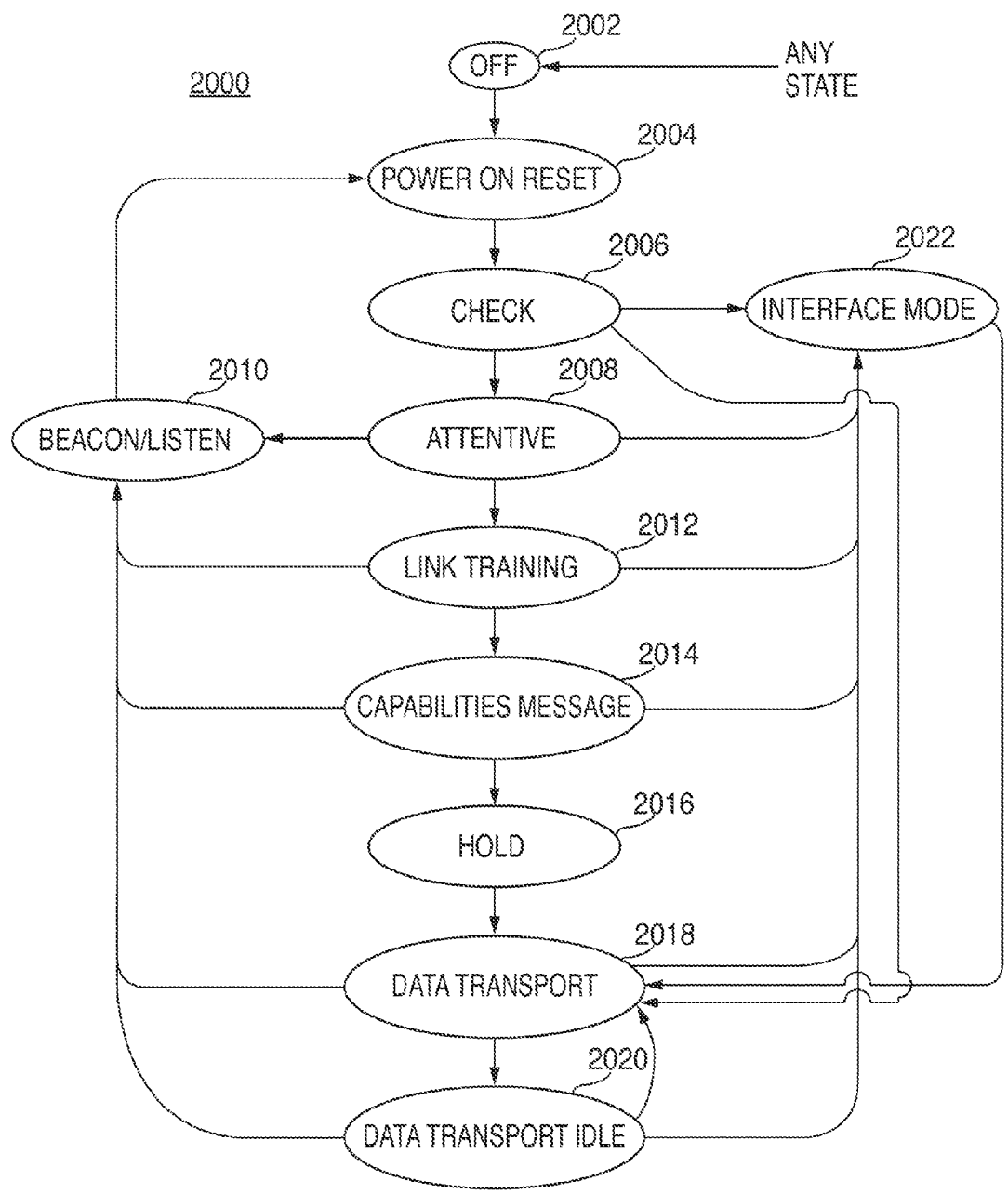
FIG. 20 shows an illustrative flowchart showing different states of a state machine, according to an embodiment.

FIG. 20 shows an illustrative flowchart of various states of the POC state machine according to an embodiment. It is understood that the POC state machine can be implemented in any communication unit, regardless of which transport mode it supports or which wake up loop configuration is used. The wake up loop configuration of FIGS. 5 and 8 are being referenced in connection with the POC state machine discussion, but it is understood that the POC state machine may be used in other wake up loop configurations. POC state machine 2000 can include the following states: OFF state 2002, power ON reset state 2004, check state 2006, attentive state 2008, beacon/listen state 2010, link training state 2012, capabilities messaging state 2014, hold state 2016, data transport state 2018, and data transport idle state 2020. Actions taken by POC state machine 2000 in response to transitioning to each state may vary depending on whether the unit executing the POC state machine is functioning as a transmitter or receiver.

Each POC state machine may collaborate to progressively transition its respective communication units through a plurality of states before establishing one or more contactless communications links. The collaboration may be necessary because the mechanism and process of establishing the contactless communications links, and enabling data transfer from a host system directly onto the contactless communications link, is performed without the intermediary (for example) of mechanical (electrical, not RF) connectors and a cable. As such, the POC state machines may rely on a "wake up" loop (sometimes referred to herein as a closed link loop) to communicate with each other before the contactless communications link is established.

The wake up loop can be an inter-unit communications channel that includes a combination of wired and contactless paths. The wake up loop can also include as many contactless units as necessary to provide the communications channel needed to establish one or more communications links. The wake up loop may define upstream and downstream relationships among the contactless communication units. The direction of the wake up loop may be based on the transmitter/receiver designations for each of the communication units. The collaborative nature of the POC state machine may be realized in that a state change transition of a first POC state machine may propagate around the wake up loop to cause a new state change in each downstream POC state machine. Each state change transition may prompt any given communications unit to notify its immediately downstream unit of its state change, thereby prompting the POC state machine of that downstream unit to transition to a new state. Thus, in order for the first POC state machine to transition to a new state, it may have to wait for state changes to propagate all the way around the loop, back to the first POC state machine. Thus, the first POC state machine may have to wait for the state machine of the immediate upstream unit to transition to a new state, and receive notification of that transition, before the first POC state machine can transition to a new state. This propagation of new state change transitions may continue to loop around the wake up loop until one or more links are enabled to transmit data between devices.

Each communication unit executes its own POC state machine, which may include several different states. In order for the POC state machine to cause a state change transition from one state to another, one or more conditions may have to be met. Some of these conditions may be provided as notifications from sources external to the communication unit or can be generated internally within the communications unit. Externally sourced notifications or signals can be received via the transceiver or pins that make up part of an integrated circuit package of the unit.

The operation of one or more states of the POC state machine may vary depending on whether the POC state machine is being implemented in an EHF unit configured to operate as a receiver or a transmitter. For example, one state may be a beacon/listen state, which may enable a unit to operate in a relatively low power mode prior to advancing through additional states to establish the communication link. A transmitter unit may be configured to transmit an EHF beaconing signal when in the beacon/listen state, whereas a receiver unit may be configured to listen for the EHF beaconing signal. As a specific example, an apparatus can include an EHF transceiver and control circuitry coupled to the EHF transceiver. The control circuitry may be operative to control establishment of an EHF communications link with another apparatus by executing a state machine that transitions from state to state in response to satisfaction of any one of a plurality of conditions, and selectively execute one of a beaconing cycle and a listening cycle based on a configuration of the apparatus, wherein the beaconing cycle is executed if the configuration is a transmitter configuration, and wherein the listening cycle is executed if the configuration is a receiver configuration. The control circuitry may execute the selected one of the beaconing cycle and the listening cycle until the state machine transitions to a new state.

A link training state may be another state that varies depending on whether it is being implemented in a transmitter or receiver. Link training may enable a receiver to calibrate itself based on a "link training" signal transmitted by a transmitter. The transmitter may transmit the link training signals when in the link training state. The receiver may receive and process the link training signals and calibrate itself for receiving future EHF signals from the transmitter when in the link training state. As a specific example, an apparatus can include an EHF transceiver and control circuitry. The control circuitry can control establishment of an EHF communications link with another apparatus by executing a state machine that transitions from state to state in response to satisfaction of any one of a plurality of conditions. The control circuitry can, selectively execute one of a transmission of a link training pattern and a calibration of at least one parameter, wherein the transmission of the link training pattern is executed if the configuration is a transmitter configuration, and wherein the calibration of at least one parameter is executed if the configuration is an receiver configuration. The control circuitry can execute the selected one of the transmission and the calibration until the state machine transitions to a new state.

A capabilities messaging state may be another state that varies depending on whether it is being implemented in a transmitter or receiver. The capabilities message may be transmitted by a transmitter and received by a receiver. The capabilities message may include information, for example, that enables the transmitter and receiver to validate whether they can establish a link and a protocol according to which data can be communicated. As a specific example, an apparatus can include an EHF transceiver and control circuitry. The control circuitry may control establishment of an EHF communications link with another apparatus by executing a state machine that transitions from state to state in response to satisfaction of any one of a plurality of conditions. The control circuitry can selectively execute one of a transmission of a capabilities message and a validation of a received capabilities message, wherein the transmission of the capabilities message is executed if the configuration is a transmitter configuration, and wherein the validation of the received capabilities message is executed if the configuration is an receiver configuration. The control circuitry and execute the selected one of the transmission and the validation until the state machine transitions to a new state.

A power savings mode state or data transport idle state may be another state that varies depending on whether it is being implemented in a transmitter or receiver. The power savings state may enable an EHF communication unit to power down selective circuitry, after the EHF communication link has been established, when there is no data to be communicated over the link. The transmitter may transmit a "keep alive" signal to the receiver to prevent it from timing out and exiting out of its power savings mode. The receiver may be periodically turned on to monitor whether the transmitter is sending the "keep alive" signal. The transmitter and receiver may transition to a new state (e.g., a data transport state) when they receive instructions to do so. As a specific example, an apparatus can include an EHF transceiver and a control circuitry. The control circuitry may be operative to control establishment of an EHF communications link with another apparatus by executing a state machine that transitions from state to state in response to satisfaction of any one of a plurality of conditions, establish the EHF communication link with the apparatus to selectively enable one of transmission and reception of data, after the EHF communication link with the apparatus is established, monitor an absence of data, a low signal, or a specific signal being communicated over the EHF communication link, and enter into a power savings state in response to the monitored absence of data, a low signal, or a specific signal being communicated over the EHF communication link until the state machine transitions to a new state.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, the processes described with respect to FIGS. 1-20, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A directed contactless communications system, comprising:
    a host device comprising:
        a first interface;
        a host controller coupled to the first interface; and
        first power sequence assistance (PSA) circuitry coupled to the first interface and the host controller, the first PSA circuitry comprising:
            host delay circuitry coupled to the first interface; and
            a first contactless communications transmitter unit (CCTU) coupled to the host delay circuitry and the host controller; and
    a non-host device operative to communicate with the host device according to a wired interface protocol, the non-host device comprising:
        a second interface for coupling to the first interface;
        a device controller coupled to the second interface; and
        second PSA circuitry coupled to the second interface and the device controller, the second PSA circuitry comprising:
            device delay circuitry coupled to the second interface;
            second CCTU coupled to the device delay circuitry and the device controller; and
            first contactless communication receiver unit (CCRU) coupled to the device controller,
        wherein in response to a coupling between the first and second interfaces, the host delay circuitry and device delay circuitry synchronize activation of at least one pin in respective first and second CCTUs to comply with timing sequence requirements of the wired interface protocol.

2. The system of claim 1, wherein the device controller is characterized as having a power up sequence time period, and
    wherein the host delay circuitry comprises a delay timer that delays activation of the at least one pin in the first CCTU by the power up sequence time period, and wherein the device delay circuitry comprises a delay timer that delays activation of the at least one pin in the second CCTU by the power up sequence time period.

3. The system of claim 1, wherein the first CCTU comprises a pin that enables a termination resistance of a host data path coupled to the host controller, and wherein the second CCTU comprises a pin that enables a termination resistance of a device data path coupled to the device controller.

4. The system of claim 1, wherein the first CCTU comprises a pin that enables the first CCTU to begin contactless communications, and wherein the second CCTU comprises a pin that enables the second CCTU to begin contactless communications.

5. The system of claim 1, wherein the first CCRU comprises a pin that is coupled to a Vbus_enable pin of the device controller, wherein in response to the coupling between the first and second mechanical interfaces, the first CCRU asserts the Vbus_enable pin to comply with timing sequence requirements of the wired interface protocol.

6. The system of claim 1, wherein the first PSA circuitry further comprises a second CCRU, wherein the first CCTU is operative to contactlessly communicate with the first CCRU, and wherein the second CCTU is operative to contactless communicate with the second CCRU.

7. A method for controlling a power sequence of a directed contactless communication system comprising a host device and a non-host device that communicate with each other according to a wired interface protocol, the method comprising:
responsive to a coupling event in which power is supplied from the host device to the non-host device:
powering up a device controller, wherein the device controller is characterized by a power up sequence time period;
initiating a host device delay timer having a first delay time period that is substantially the same as the power up sequence time period; and
initiating a non-host device delay timer having a second delay time period that is substantially the same as the power up sequence time period;
enabling a termination and contactless transmission of a first contactless communication transmission unit (CCTU) coupled to a host controller of the host device at an end of the first delay time period; and
enabling a termination and contactless transmission of a second CCTU coupled to the device controller of the non-host device at an end of the second delay time period, wherein the enabling of the terminations and the contactless transmissions of the first and second CCTUs are timely performed to comply with timing sequence requirements of the wired interface protocol.

8. The method of claim 7, further comprising:
instructing a first contactless communication receiver unit (CCRU) that is coupled to the device controller to enable a Vbus_enable pin of the device controller in response to contactless transmission from the first CCTU.

9. The method of claim 8, wherein enablement of the Vbus_enable pin confirms to the device controller that the non-host device is coupled to the host device.

10. The method of claim 8, wherein a second CCRU is coupled to the host controller,
wherein the first CCTU contactlessly communicates with the first CCRU, and wherein the second CCTU contactlessly communicates with the second CCRU.

11. The method of claim 8, further comprising:
wherein a host controller begins negotiating a link in response to the enabled termination; and
wherein the device controller begins negotiating with the host controller in response to the enabled Vbus and enabled termination of the second CCTU.

12. An automatic contactless communications non-host device that uses a coupling to receive power from a host device and that communicates with the host device according to a wired interface protocol, comprising:
a first interface;
a device controller coupled to the first interface; and
first power sequence assistance (PSA) circuitry coupled to the first interface and the device controller, the first PSA circuitry comprising:
device delay circuitry coupled to the first mechanical interface;
a first contactless communications transmitter unit (CCTU) coupled to the device delay circuitry and the device controller; and
a first contactless communications receiver unit (CCRU) coupled to the device controller, wherein the first CCTU and first CCRU operate according to respective state machines that timely control activation of a termination associated with the first CCTU and assertion of a Vbus_enable of the device controller in order to comply with timing sequence requirements of the wired interface protocol.

13. The non-host device of claim 12, wherein the state machines are progression of consciousness state machines.

14. The non-host device of claim 12, wherein the first CCTU contactlessly communicates with a second CCRU associated with the host device, and wherein the first CCRU contactlessly communicates with a second CCTU associated with the host device, wherein the first and second CCTUs and CCRUs collaborate to timely control activation of the termination associated with the first CCTU, activation of a termination associated with the host device, and assertion of the Vbus_enable of the device controller in order to comply with timing sequence requirements of the wired interface protocol.

15. The non-host device of claim 12, wherein the device controller is characterized as having a power up sequence time period, and wherein the device delay circuitry comprises a delay timer having a delay period that equals or exceeds the power up sequence time period, wherein the first CCTU activates its termination and begins contactlessly transmitting when the delay period lapses.

16. The non-host device of claim 15, wherein the Vbus_enable of the device controller is enabled when the first CCRU receives a contactless communication from a CCTU associated with the host device.

17. A method for controlling a power sequence of an automatic contactless communication non-host device that communicates with a host device according to a wired interface protocol, the method comprising:
receiving power from the host device in response to a coupling between the host device and the non-host device, wherein a trigger point earmarks an initial receipt of the power;
at the trigger point, powering up a device controller, wherein the device controller is characterized by a power up sequence time period;
at the trigger point, initiating a device delay timer having a delay time period that is substantially the same as the power up sequence time period;

enabling a termination and contactless communication of a first contactless communication transmission unit (CCTU) coupled to the device controller at an end of the delay time period; and asserting a Vbus_enable of the device controller when a first contactless communication receiver unit (CCRU) in response to receiving a contactless signal from the a CCTU associated with the host device, wherein the enabling of the termination and the asserting of the Vbus_enable are timely performed to comply with timing sequence requirements of the wired interface protocol.

18. The method of claim 17, wherein the first CCTU and first CCRU operate according to respective state machines that timely control the enabling of the contactless communication and the asserting of the Vbus_enable.

19. The method of claim 18, wherein the state machines are progression of consciousness state machines, and wherein the Vbus_enable is asserted in response to completion of the progression of consciousness state machines.

20. The method of claim 19, wherein the first CCTU contactlessly communicates with a second CCRU associated with the host device, and wherein the first CCRU contactlessly communicates with a second CCTU associated with the host device, wherein the first and second CCRUs and CCRUs collaborate to timely control activation of the termination associated with the first CCTU, activation of a termination associated with the host device, and assertion of the Vbus_enable of the device controller in order to comply with timing sequence requirements of the wired interface protocol.

21. The method of claim 17, further comprising:
contactlessly communicating data between the host device and the non-host device according to the wired interface protocol after the termination has been enabled and the Vbus_enable has been asserted.

* * * * *

UNITED STATES PATENT AND TRADEMARK OFFICE
CERTIFICATE OF CORRECTION

| | | |
|---|---|---|
| PATENT NO. | : 9,927,854 B2 | Page 1 of 2 |
| APPLICATION NO. | : 15/063845 | |
| DATED | : March 27, 2018 | |
| INVENTOR(S) | : Isaac et al. | |

It is certified that error appears in the above-identified patent and that said Letters Patent is hereby corrected as shown below:

In the Drawings

On Sheet 10 of 19, Figure 10, in tag 1040, Line 5, delete "VBUS-ENABLE" and insert -- VBUS_ENABLE --, therefor.

In the Specification

In Column 1, Line 58, delete "riles." and insert -- rules. --, therefor.

In Column 7, Line 17, delete "Display Port" and insert -- DisplayPort --, therefor.

In Column 8, Line 25, delete "embodiment:" and insert -- embodiment; --, therefor.

In Column 13, Line 56, delete "253" and insert -- 253, --, therefor.

In Column 17, Line 24, delete "537" and insert -- 537, --, therefor.

In Column 19, Line 52, delete "HDP" and insert -- HPD --, therefor.

In Column 20, Line 3, delete "HDP)." and insert -- HPD). --, therefor.

In Column 22, Line 57, delete "herein below" and insert -- hereinbelow --, therefor.

In Column 24, Line 50, delete "(00B)" and insert -- (OOB) --, therefor.

In Column 27, Line 52, delete "an" and insert -- a --, therefor.

In Column 32, Line 37, delete "an" and insert -- a --, therefor.

In Column 32, Line 60, delete "an" and insert -- a --, therefor.

Signed and Sealed this
Fifth Day of May, 2020

Andrei Iancu
*Director of the United States Patent and Trademark Office*

In the Claims

In Column 38, Claim 20, Line 7, delete "CCRUs" and insert -- CCTUs --, therefor.